INVENTOR.
ARTHUR LEO JENKINS

June 28, 1966  A. L. JENKINS  3,258,749
CONTROL APPARATUS
Filed Feb. 4, 1963  9 Sheets-Sheet 2

INVENTOR.
ARTHUR LEO JENKINS
BY Roger W. Jensen
ATTORNEY

INVENTOR.
ARTHUR LEO JENKINS

June 28, 1966 A. L. JENKINS 3,258,749
CONTROL APPARATUS
Filed Feb. 4, 1963 9 Sheets-Sheet 9

INVENTOR.
ARTHUR LEO JENKINS
BY
Roger W. Jensen
ATTORNEY

United States Patent Office 3,258,749
Patented June 28, 1966

3,258,749
CONTROL APPARATUS
Arthur Leo Jenkins, Azusa, Calif., assignor to
Honeywell Inc., a corporation of Delaware
Filed Feb. 4, 1963, Ser. No. 255,978
10 Claims. (Cl. 340—172.5)

This invention pertains to improvements in control apparatus and more particularly to improvements in multiplexing circuits.

In a broad sense this invention can be thought of as a multiple-pole, multiple-position switch capable of being sequentially operated, position by position, through its entire range or of being instantaneously operated to any desired position, the switch being able to determine whether any information is available for transfer at a particular position, and for bypassing that position if no information is available.

This invention comprises a binary counter having first inputs adapted to be connected to an input signal source whereby the count of the counter can be automatically set to any desired count, and a second input which, when energized, causes the count of the counter to be sequentially increased one count at a time. The counter further has a plurality of outputs, each of the outputs being representative of a bit of the binary number. The output of the binary counter is fed to a decoder where the lower order bits of the binary counter output are decoded into an equivalent number in a first series of numbers having a radix other than 2, and the higher order bits of the output of the binary counter are decoded into an equivalent number in a second series of numbers having a radix other than 2. The numbers of the first series of numbers and the numbers of the second series of numbers are combined to form a plurality of signal pairs, one signal in each pair coming from the first series of numbers and the other signal in each pair coming from the second series of numbers. The number of the plurality of signal pairs is equal to the maximum count of the binary counter. Each signal pair is connected to a first input of a separate control gate. A first output of each control gate is connected to a separate data gating circuit whereby an output signal from each control gate controls the conduction of its respective data gating circuit. The input of each data gating circuit is adapted to be connected to a separate data source, while the output of each data gating circuit is adapted to be connected to a load, for instance the input unit of a control computer. A second input of each control gate is adapted to be connected to a separate one of the data sources whereby each of the control gates produces an output signal at its first output when there is an output from its respective data source, each control gate producing an output at a second output when there is no output signal from its respective data source.

The second output of each of the control gates is connected to the input of a NO INFORMATION gate. The output of the NO INFORMATION gate is connected to a first input of a control circuit. A signal from the NO INFORMATION gate causes the control circuit to produce a signal which is fed to the second input of the binary counter thereby causing the binary counter to increase its count by 1.

The first outputs of each control gate are connected to an INFORMATION READY gate. The output of the INFORMATION READY gate is connected to the control circuit whereby an output signal from the INFORMATION READY gate causes the control circuit to produce an output signal which can be fed to the input of the computer so as to inform the computer that information is being transferred.

The control circuit further has an input adapted to be connected to the computer input whereby the computer input can transmit a signal to the control circuit after the data has been transferred to the input of the computer thereby telling the control circuit to advance the binary counter to a new position.

It is one object of this invention, therefore, to provide an improved multiplexing circuit.

It is another object of this invention to provide a multiplexing circuit for transferring data from a plurality of positions and capable of operating sequentially from position to position or instantaneously moving to any desired position.

It is a further object of this invention to provide a multiplexing circuit for transferring data from a plurality of positions and capable of operating sequentially from position to position and of bypassing any particular position in the event there is no data available for transfer.

Figure 1:
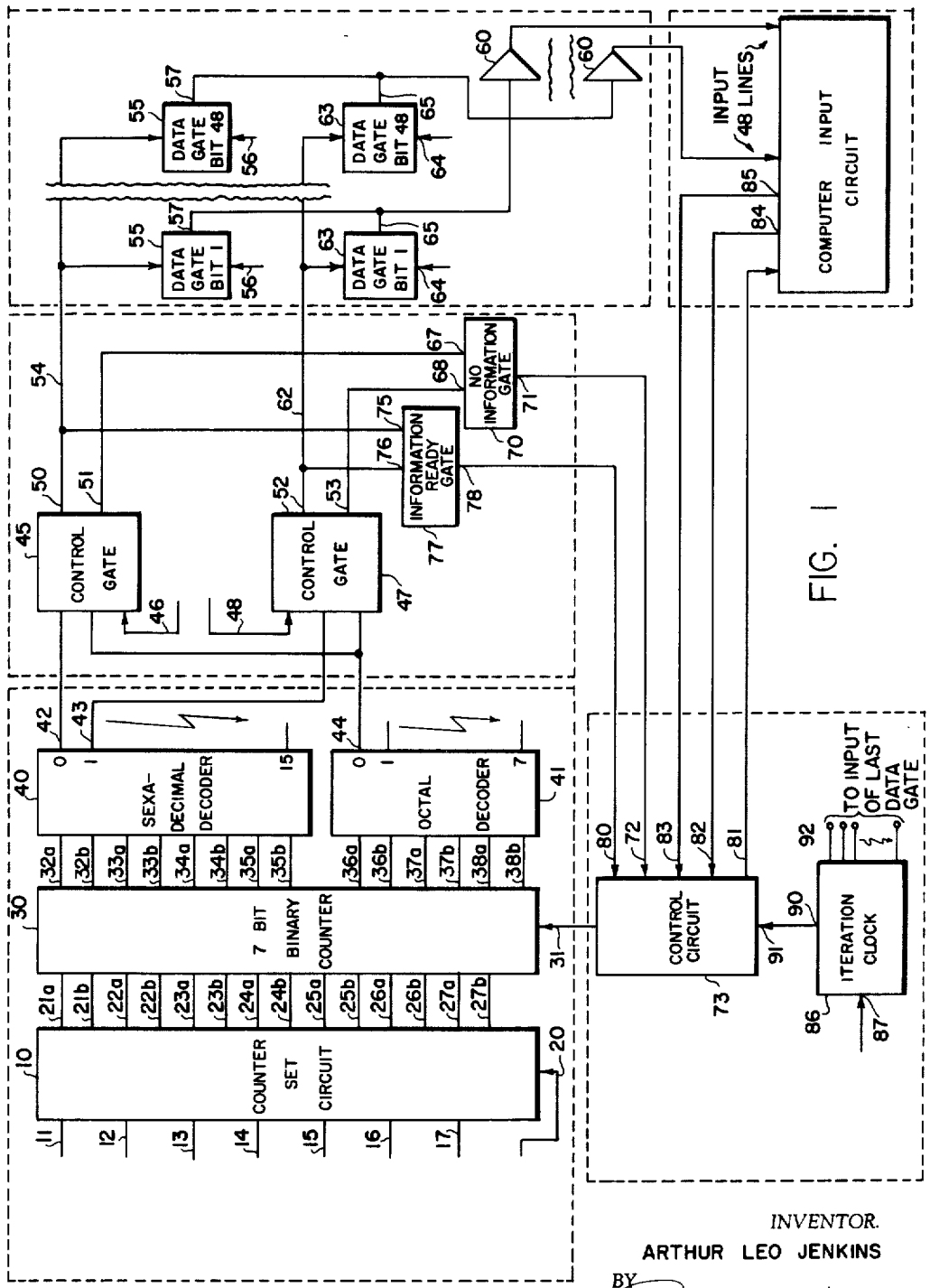
FIGURE 1 is a block diagram representation of an embodiment of this invention.

These and other objects of my invention will become apparent to those skilled in the art upon consideration of the accompanying specification, claims, and drawings of which:

Structure of FIGURE 1

Referring to FIGURE 1 there is shown a COUNTER SET CIRCUIT 10 having a plurality of inputs 11–17, a counter set input 20, and a plurality of outputs 21a and b through 27a and b. The outputs of the COUNTER SET CIRCUIT are connected to the input of a seven-bit binary counter 30. Counter 30 has an advance counter input 31 and a plurality of outputs 32a and b through 38a and b.

The lower order outputs 32a and b through 35a and b of binary counter 30 are fed to a sexadecimal decoder 40, while the higher order outputs 36a and b through 38a and b of binary counter 30 are fed to the input of an octal decoder 41. Sexadecimal decoder 40 has sixteen outputs corresponding to the numerals 0–15, while octal decoder 41 has eight outputs corresponding to numerals 0–7. The outputs of sexadecimal decoder 40 and the outputs of octal decoder 41 are combined to form 128 signal pairs with one signal from each decoder per pair. For the sake of clarity in the drawings, FIGURE 1 shows only a few of the outputs of the sexadecimal decoder 40 and the octal decoder 41. The zero output of sexadecimal decoder 40 appears at output terminal 42 while the one output of sexadecimal decoder 40 appears at output terminal 43. The zero output of octal decoder 41 is shown appearing at terminal 44. A first signal pair made up of the zero output of sexadecimal decoder 40 appearing at output 42 and the zero output of octal decoder 41 appearing at output 44 are coupled to the input of a control gate 45. Control gate 45 further has an EXECUTE input 46. Similarly, a signal pair comprising the one output of sexadecimal decoder 40 and the zero output of octal decoder 41 appearing at output terminals 43 and 44 respectively are coupled to the input of a control gate 47. Control gate 47 also has an execute input 48. For the sake of clarity only the control gates 45 and 47 are shown, however, it should be realized that in the complete multiplexer circuit there would be 128 control gates similar to gates 45 and 47, and that the 128 signal pairs from the outputs of decoders 40 and 41 would be coupled to the input of the control gates, one signal pair to the input of each control gate.

Control gate 45 has a first output 50 and a second output 51, while control gate 47 has a first output 52 and a second output 53. Output 50 of control gate 45 is connected by means of a conductor 54 to the input of a plurality of data gates 55. While in FIGURE 1 only two data gates numbered 55 are shown; in actual practice there are 48 such data gates. Each of the data gates 55 has a second input 56 and an output 57. The inputs 56 of the data gates 55 are connected to respective bits of a 48-bit data word. When an output appears at output 50 of control gate 45 this signal is coupled through conductor 54 and enables the data gates 55 thereby allowing the data word appearing at input 56 to appear at the outputs 57 of data gates 55. Each of the outputs 57 of data gates 55 are connected to the input of amplifiers 60. Only two amplifiers 60 are shown in FIGURE 1; however, in actual practice there are 48 such amplifiers, one amplifier connected to each of the outputs 57 of the data gate 55. Each of the outputs of the 48 amplifiers 60 are connected to a separate input line in the computer input circuit.

The output 52 of control gate 47 is connected by means of a conductor 62 to the input of data gates 63. As explained above in conjunction with data gates 55, while there are only two data gates 63 shown, in actual practice there are 48 such gates. Data gates 63 further have inputs 64 adapted to be connected to a data input word in the same manner as explained in conjunction with data gate 55. The outputs 65 of data gates 63 are connected to the inputs of amplifiers 60.

The second outputs 51 and 53 of control gates 45 and 47 respectively are respectively connected to inputs 67 and 68 of a NO INFORMATION gate 70. As shown in FIGURE 1 NO INFORMATION gate 70 has only two inputs 67 and 68; however, it should be understood that in actual practice NO INFORMATION gate 70 will have a plurality of inputs and that the second outputs of the control gates will be fed to respective inputs of the NO INFORMATION gate 70. An output 71 of NO INFORMATION gate 70 is connected to an input 72 of a control circuit 73.

The first outputs 50 and 52 of control gates 45 and 47 respectively are respectively connected to first and second inputs 75 and 76 of an INFORMATION READY gate 77. As shown in FIGURE 1, INFORMATION READY gate 77 has only two inputs 75 and 76, however, in actual practice INFORMATION READY gate 77 has a plurality of inputs and it should be understood that the first outputs of the control gates are fed to separate inputs in the INFORMATION READY gate 77. An output 78 of INFORMATION READY gate 77 is connected to an input 80 of control circuit 73.

An output 81 of control circuit 73 is connected to the computer input circuit. An input 82 and an input 83 of control circuit 73 are respectively connected to outputs 84 and 85 of the computer input circuit.

An iteration clock circuit 86 has an input 87, an output 90, and a plurality of outputs 92. Output 90 of iteration clock 86 is connected to an input 91 of control circuit 73. Outputs 92 of iteration clock 86 are connected to separate bits of the last data gate.

Operation of FIGURE 1

Referring to FIGURE 1, the general operation of the present invention is as follows: binary counter 30 can be set to a desired configuration to the operation of the COUNTER SET circuit 10 or can be sequentially operated through its counting range by input pulses fed from the control circuit 73 to counter 30 on input conductor 31.

The four lower order bits of binary counter 30, appearing on outputs 32a and b through 35a and b, are coupled to sexadecimal decoder 40. The higher order bits of binary counter 30, appearing on outputs 36a and b through 38a and b, are coupled to octal decoder 41. Sexadecimal decoder 40 converts the binary number input into an equivalent number in a series of numbers having a radix of 16. Similarly, octal decoder 41 converts its binary number input into an equivalent number in a series of numbers having a radix of 8. For example, if the binary number input to sexadecimal decoder 40 is 0000, then an output signal will appear at the zero output line 42 of sexadecimal decoder 40. If the binary number input to sexadecimal decoder 40 were 1111, then an output signal would appear at the output line of decoder 40 representative of number 15.

Similarly, if the binary input to octal decoder 41 were 000, then an output signal would appear at the zero output line 44 of the octal decoder 41.

The outputs of the sexadecimal decoder 40 and the octal decoder 41 are combined to form 128 signal pairs, each signal pair having one signal from each decoder.

Each signal pair is connected to the input of a control gate. Since there are 128 signal pairs there must also be 128 control gates. For the sake of clarity only two of the data control gates 45 and 47, are shown in FIGURE 1. As explained previously, when the binary input to sexadecimal decorder 40 is 0000 an output signal will appear on zero output 42 and, when the binary input to octal decoder 41 is 0000 an output signal will appear on the zero output 44. The signal on output 42 of sexadecimal decoder 40 is coupled to the input of control gate 45 and likewise the signal on output 44 of octal decoder 41 is also coupled to the input of control gate 45. If an EXECUTE signal appears on input 46 of control gate 45 then an output signal will appear on output 50 of control gate 45. If the EXECUTE signal is not present on input 46 of control gate 45 when an output signal appears at outputs 42 and 44 of decoders 40 and 41 respectively, then an output signal will appear at output 51 of control gate 45. When an output signal appears at output 50 of control gate 45 it is coupled through conductor 54 to the input of data gates 55. Data gate position 55 comprises 48 data gates, bit 1 through bit 48, only two of which are shown in FIGURE 1 for the sake of clarity, bit 1 and bit 48. Each input 56 of the data gate bits 1 through 48 are adapted to be connected to a data source and to receive separate bits of a 48-bit computer word from the data source. The outputs 57 of data gates 55 are each connected to an individual amplifier 60 and the output of each of the amplifiers 60 is connected to the computer input circuit. The signal appearing at the output 50 of control gate 45 which is coupled to the input of data gates 55 enables data gate 55 so that the computer word appearing at input 56 can be coupled through data gate 55 and amplifier 60 to the computer input circuit. Whenever a data source has information ready for transfer to the computer input an EXECUTE signal is generated which is fed, in the case of control gate 45, to the input 46 of control gate 45. If a control gate is energized by the outputs from decoders 40 and 41 and the EXECUTE signal is not present, meaning that the corresponding data source has no information ready for transfer to the computer input, the control gate produces an output at its second output terminal. For instance, assume that sexadecimal decoder 40 has an output on its one terminal 43 while octal decoder 41 has an output at its zero output 44. These outputs will be coupled to the input of control gate 47. If the EXECUTE signal on EXECUTE input 48 of control gate 47 is not present then control gate 47 will produce an output signal on its second output 53 which will be coupled to the input 68 of NO INFORMATION gate 70. NO INFORMATION gate 70 is in effect an OR gate and the input signal at its input 68 will be coupled to its output 71 and from there to the input 72 of the control circuit 73 thereby causing control circuit 73 to produce an output which is coupled to input 31 of binary counter 30 thereby causing counter 30 to increase its count by one count. In other words, it can be seen that if the EXECUTE signal is not present at any particular control gate as the multiplexer scans through its entire range this particular position will be skipped. If the EXECUTE signal had been present at input 46 of control gate 45, an output signal would appear at the output 50 which would be coupled through conductor 54 to the input of data gates 55 thereby enabling data gates 55. At the same time the output signal at output 50 of control gate 45 would be coupled to the input 75 of INFORMATION READY gate 77, thereby producing an output at output 78 of gate 77 which is coupled to the input 80 of control circuit 73. A signal at input 80 of control circuit 73 causes an output signal to appear at output 81 of control circuit 73 which is coupled to the computer input circuit to notify the computer input circuit that data is ready to be transferred.

After an information word has been transferred through the data gates to the computer input circuit the computer input circuit sends a signal from its output 84 to input 82 of the control circuit which causes a signal to appear at the output of control circuit 73 which is coupled to input 31 of binary counter 30 thereby causing counter 30 to increase its count by one. When the computer input circuit is ready to accept another information word a signal is sent from the output terminal 85 of the computer input circuit to the input 83 of control circuit 73.

The multiplexer operates on a one-second iteration cycle, that is, the 128 positions of the multiplexer are scanned once each second. The one second iteration period is controlled by the iteration clock 86. Iteration clock 86 has an output 90 which is connected to input 91 of control circuit 73. When the multiplexer has scanned its 128 positions and returns to position zero it will remain at position zero until the occurrence of an iteration clock pulse. Iteration clock 86 contains a clock counter which counts the pulses applied to input 87. The count in the iteration clock counter appears at the outputs 92 of iteration clock 86 and is fed to the input of the last data gate. The purpose of the clock counter will be described in detail hereinafter.

Figure 2:
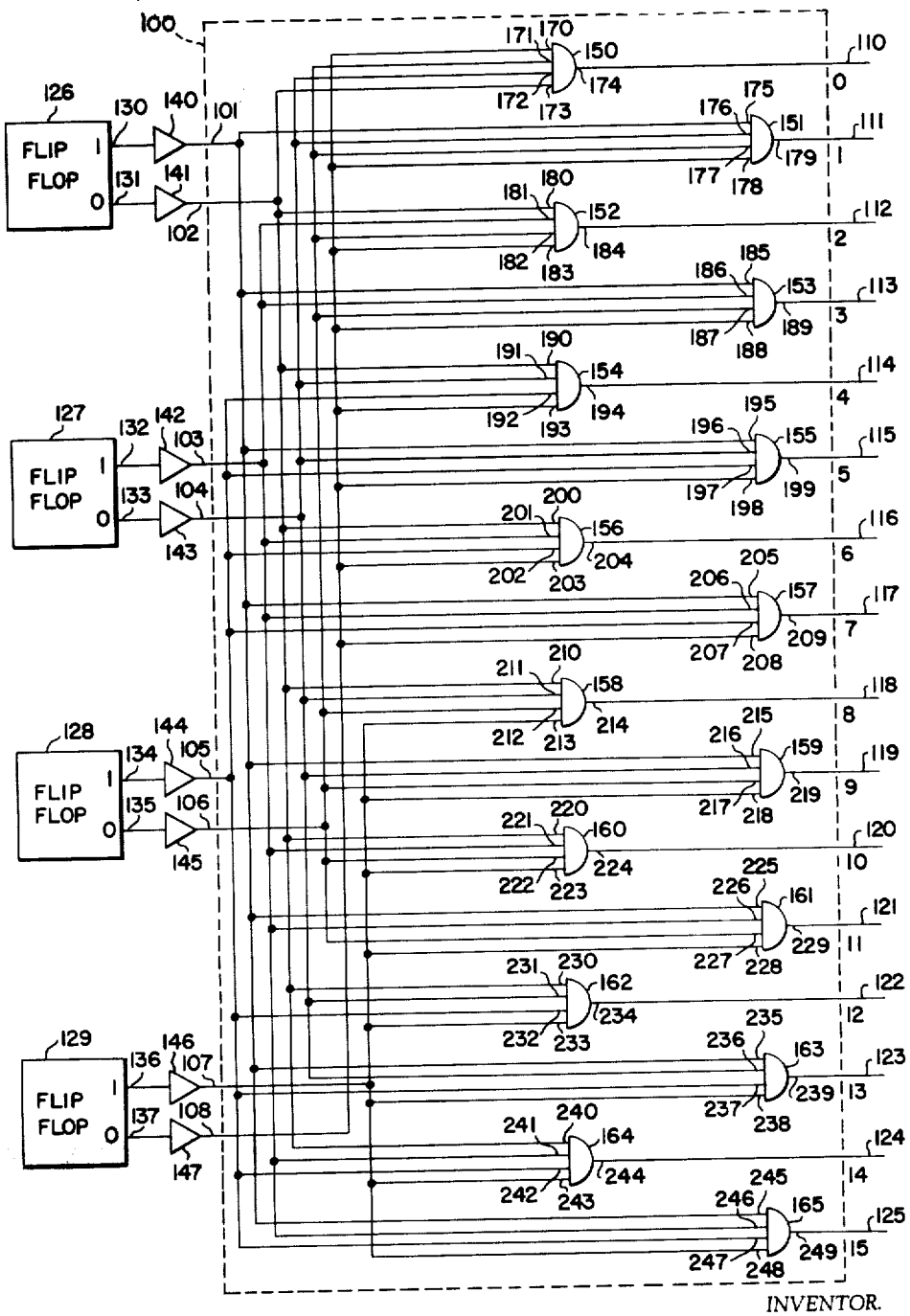
FIGURE 2 is a schematic representation of a decoder used in this invention.

*Structure of FIGURE 2*

FIGURE 2 is a diagrammatic representation of a sexadecimal decoder suitable for use in the present invention. Referring to FIGURE 2 there is shown a sexadecimal decoder 100 having a plurality of inputs 101–108, and a plurality of outputs 110–125.

A plurality of flip-flops 126, 127, 128 and 129 are represenative of successive stages of a binary counter, flip-flop 126 representing the lowest order bit of the binary counter and flip-flop 129 representing the highest order bit of the binary counter. Flip-flop 126 has a "1" output 130 and a "0" output 131. Flip-flop 127 has a "1" output 132 and a "0" output 133, flip-flop 128 has a "1" output 134 and a "0" output 135, and flip-flop 129 has a "1" output 136 and a "0" output 137.

Output 130 of flip-flop 126 is coupled through an amplifier 140 to input 101 of decoder 100, while output 131 of flip-flop 126 is coupled through an amplifier 141 to input 102 of decoder 100. Similarly, output 132 of flip-flop 127 is coupled through an amplifier 142 to the input 103 of decoder 100 while output 133 of flip-flop 127 is coupled through amplifier 143 to input 104 of decoder 100, output 134 of flip-flop 128 is coupled through an amplifier 144 to the input 105 of decoder 100 while output 135 of flip-flop 128 is coupled through an amplifier 145 to input 106 of decorder 100, and output 136 of flip-flop 129 is coupled through an amplifier 146 to the input 107 of decoder 100 while output 137 of flip-flop 129 is coupled through an amplifier 147 to the input 108 of decoder 100.

Sexadecimal decoder 100 further comprises a plurality of AND gates 150–165. AND gate 150 has a plurality of inputs 170–173 and an output 174, AND gate 151 has a plurality of inputs 175–178 and an output 179, AND gate 152 has a plurality of inputs 180–183 and an output 184, AND gate 153 has a plurality of inputs 185–188 and an output 189, AND gate 154 has a plurality of inputs 190–193 and an output 194, AND gate 155 has a plurality of inputs 195–198 and an output 199, AND gate 156 has a plurality of inputs 200–203 and an output 204, AND gate 157 has a plurality of inputs 205–208 and an output 209, AND gate 158 has a plurality of inputs 210–213 and an output 214, AND gate 159 has a plurality of inputs 215–218 and an output 219, AND gate 160 has a plurailty of inputs 220–223 and an output 224, AND gate 161 has a plurality of inputs 225–228 and an output 229, AND gate 162 has a plurality of inputs 230–233 and an output 234, AND gate 163 has a plurality of inputs 235–238 and an output 239, AND gate 164 has a plurality of inputs 240–243 and an output 244, and AND gate 165 has a plurailty of inputs 245–248 and an output 249. Outputs 174, 179, 184, 189, 194, 199, 204, 209, 214, 219, 224, 229, 234, 239, 244 and 249 of AND gates 150–165 respectively are connected to output terminals 110–125 respectively of sexadecimal decoder 100.

Input 101 of sexadecimal decoder 100 is connected to inputs 175, 185, 195, 205, 225, 235 and 245 of AND gates 151, 153, 155, 157, 159, 161, 163 and 165, respectively. Input terminal 102 of sexadecimal decoder 100 is connected to inputs 173, 180, 190, 200, 210, 220, 230 and 240 of AND gates 150, 152, 154, 156, 158, 160, 162 and 164 respectively. Input terminal 103 of sexadecimal decoder 100 is connected to inputs 181, 186, 201, 206, 221, 226, 241 and 246 of AND gates 152, 153, 156, 157, 160, 161, 164 and 165. Input terminal 104 of sexadecimal decoder 100 is connected to inputs 172, 176, 191, 196, 211, 216, 231 and 236 of AND gates 150, 151, 154, 155, 158, 159, 162 and 163. Input terminal 105 of sexadecimal decoder 100 is connected to inputs 192, 197, 202, 232, 237, 242 and 247 of AND gates 154, 155, 156, 157, 162, 163, 164 and 165. Input terminal 106 of sexadecimal decoder 100 is connected to inputs 171, 177, 182, 187, 212, 217, 222 and 227 of AND gates 150, 151, 152, 153, 158, 159, 160 and 161. Input terminal 107 of sexadecimal decoder 100 is connected to inputs 213, 218, 223, 228, 233, 238, 243 and 248 of AND gates 158, 159, 160, 161, 162, 163, 164 and 165. Terminal 108 of decoder 100 is connected to inputs 170, 178, 183, 188, 193, 198, 203 and 208 of AND gates 150, 151, 152, 153, 154, 155, 156 and 157.

*Operation of FIGURE 2*

The sexadecimal decoder 100 is used to translate the outputs of flip-flops 126, 127, 128 and 129 from a binary to a sexadecimal configuration. The decimal weights of flip-flops 126, 127, 128 and 129 are 1, 2, 4 and 8, respectively. Each sexadecimal decoder (0–15) is formed by ending the outputs, either "1" or "0," of flip-flops 126–129 which will be in the "1" state for a given sexadecimal number. For example, assume that the outputs of flip-flops 126–129 represent the binary number 10, in other words, flip-flop 129 is in the "1" state, flip-flop 128 is in the "0" state, flip-flop 127 is in the "1" state and flip-flop 126 is in the "0" state. When flip-flop 126 is in the "0" state a pulse will appear at its output 131 which is coupled through amplifier 141 to input terminal 102 of the sexadecimal decoder 100. From terminal 102 the pulse is applied to input 220 of AND gate 160. Since the flip-flop 127 is in the "1" state a pulse will appear at its output 132 which is coupled through amplifier 142 to terminal 103 of sexadecimal decoder 100, and from terminal 103 is applied to input 221 of AND gate 160. Flip-flop 128 being in the "0" state, a pulse will appear at its output 135 which is coupled through amplifier 145 to the input terminal 106 of decoder 100, and from terminal 106 is applied to input 222 of AND gate 160. Similarly, since flip-flop 129 is in the "1" state a pulse will appear at its output 136 which is coupled through amplifier 146 to terminal 107 of sexadecimal decoder 100, and from terminal 107 is applied to input 223 of AND gate 160. It can therefore be seen that all of the inputs 220–223 of AND gate 160 have a pulse applied thereto and therefore a pulse will appear at the output 224 of AND gate 160 which is coupled to output 120 of sexadecimal decoder 100. Output 120 of decoder 100 represents the decimal output 10, which is the decimal equivalent of the binary number appearing at the outputs of flip-flops 126–129. Further examination will show that AND gate 160 is the only AND gate in the decoder which has a pulse at all of its inputs and hence AND gate 160 is the only AND gate which will generate an output signal for the particular binary number input.

Structure of FIGURES 3–9

Figure 3:
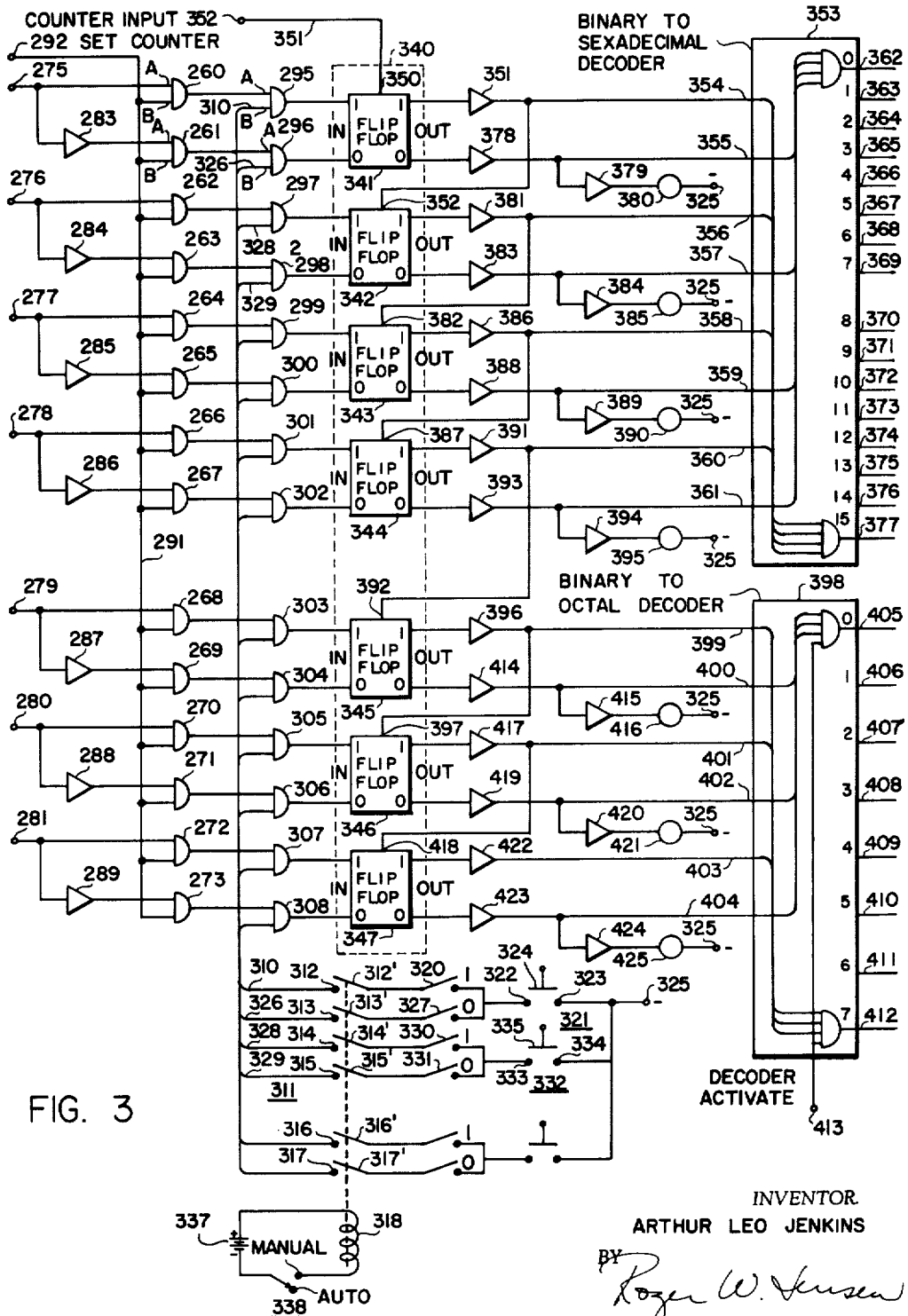
FIGURES 3-9 are a schematic representation of an embodiment of this invention.

Referring to FIGURE 3 there is shown a plurality of AND gates 260–273, each having a first input A, a second input B, and an output. For the sake of clarity the A and B letter designations have been shown on AND gates 260 and 261 only but it is to be understood that all of the AND gates 260–273 have similar A and B inputs. A plurality of input terminals 275–281 are adapted to be connected to an input source, such as a computer, and to receive input formation in the form of a binary number. Input 275 is connected to the A input of AND gate 260 and, through an inverting amplifier 283 to the A input of AND gate 261. Input terminal 276 is connected to the A input of AND gate 262 and, through an inverting amplifier 284 to the A input of AND gate 263. Similarly, input terminal 277 is connected to the A input of AND gate 264 and, through an inverting amplifier 285 to the A input of AND gate 265, input terminal 278 is connected to the A input of AND gate 266 and, through an inverting amplifier 286, to the A input of AND gate 267, input terminal 279 is connected to the A input of AND gate 268 and, to an inverting amplifier 287 to the A input of AND gate 269, input terminal 280 is connected to the A input of AND gate 270, and through an inverting amplifier 288 to the A input of AND gate 271, and input terminal 281 is connected to the A input of AND gate 272 and, through an inverting amplifier 289 to the A input of AND gate 273.

All of the B inputs of AND gates 260–273 are connected by means of a conductor 291 to a set counter input terminal 292.

A plurality of OR gates 295–308 each have a first input A, a second input B and an output. For the sake of clarity the A and B letter designations have been shown on OR gates 295 and 296 only but it is to be understood that all of the OR gates 295–308 have similar A and B inputs.

The outputs of AND gates 260–273 are respectively connected to the A inputs of OR gates 295–308.

The B input of OR gate 295 is connected by means of a conductor 310 to a fixed contact 312 of a relay 311. Relay 311 further has fixed contacts 313, 314, 315, 316 and 317, movable contacts 312', 313', 314', 315', 316' and 317', and a winding 318. Movable contacts 312'–317' are operable to make contact with fixed contacts 312–317.

Movable contact 312' of relay 311 is connected through a "1" switch 320 to a fixed contact 322 of a switch 321. Switch 321 further has a fixed contact 323 and a movable contact 324, contact 324 being operable to complete a connection between fixed contacts 322 and 323. Fixed contact 323 of switch 321 is connected to a negative source of energizing potential 325.

The B input of OR gate 296 is connected by means of a conductor 326 to fixed contact 313 of relay 311. Movable contact 313' of relay 311 is connected through a "0" switch 327 to the fixed contact 322 of switch 321.

Each B input of OR gate 297–308 is connected to a fixed contact of relay 311 in a manner similar to that previously described. Alternate movable contacts of relay 311 are alternately connected to the movable contacts of a "1" switch and a "0" switch and the fixed contacts of each pair of "1" and "0" switches is connected through a switch to the negative energizing potential source 325. For the sake of clarity all of the contacts of relay 311 have not been shown nor have all of the switches. As an example, the B input of OR gate 297 is connected by means of a conductor 328 to fixed contact 314 of relay 311, while the B input of OR gate 298 is connected by means of a conductor 329 to the fixed contact 315 of relay 311. The movable contacts 314' and 315' of relay 311 are respectively connected through a "1" switch 330 and a "0" switch 331 to a fixed contact 333 of a switch 332. A fixed contact 334 of switch 332 is connected to the negative potential source 325. A movable contact 335 of switch 332 is operable to complete a connection between fixed contacts 333 and 334.

A battery 337 and an AUTO-MANUAL switch 338 are connected in series across winding 318 of relay 311.

A seven-bit binary counter 340 comprises seven flip-flops 341–347, with flip-flop 341 being the lowest order bit and flip-flop 347 being the highest order bit. Each of the flip-flops 341–347 has a "1" input and a "0" input and a "1" output and a "0" output. An input terminal 350 of flip-flop 341 is connected by means of a conductor 351 to a counter input terminal 352. The output terminals of OR gates 295 and 296 are connected to the "1" and "0" inputs of flip-flop 341 respectively. Similarly, the output terminals of OR gates 297 and 298 are respectively connected to the "1" and "0" inputs of flip-flop 342, the output terminals of OR gates 299 and 300 are respectively connected to the "1" and "0" inputs of flip-flop 343, the output terminals of OR gates 301 and 302 are respectively connected to the "1" and "0" inputs of flip-flop 344, the output terminals of OR gates 303 and 304 are respectively connected to the "1" and "0" inputs of flip-flop 345, the output terminals of OR gates 305 and 306 are respectively connected to the "1" and "0" inputs of flip-flop 346, and the output terminals of OR gates 307 and 308 are respectively connected to the "1" and "0" inputs of flip-flop 347.

The "1" output of flip-flop 341 is connected through an amplifier 351 to an input terminal 352 of flip-flop 342, and to an input 354 of a binary-to-sexadecimal decoder 353. Decoder 353 further has inputs 355–361 and outputs 362–377.

The "0" output of flip-flop 341 is connected through an amplifier 378 to input 355 of decoder 353, and through amplifier 378 and an amplifier 379 in series with an indicator, such as a light, 380 to the negative source of energizing potential 325. The "1" output of flip-flop 342 is connected through an amplifier 381 to an input 382 of flip-flop 343, and to the input 356 of decoder 353. The "0" output of flip-flop 342 is connected through an amplifier 383 to the input 357 of decoder 353, and through amplifier 383 and an amplifier 384 in series with an indicator 385 to the negative potential source 325. The "1" output of flip-flop 343 is connected through an amplifier 386 to an input 387 of flip-flop 344 and to the input 358 of decoder 353. The "0" output of flip-flop 343 is connected through an amplifier 388 to the input 359 of decoder 353, and through an amplifier 388 and an amplifier 389 in series with an indicator 390 to the negative potential source 325. The "1" output of flip-flop 344 is connected through an amplifier 391 to an input 392 of flip-flop 345, and to the input 360 of sexadecimal decoder 353. The "0" output of flip-flop 344 is coupled through an amplifier 393 to the input 361 of decoder 353, and through amplifier 393 and an amplifier 394 in series with an indicator 395 to the negative potential source 325.

The "1" output of flip-flop 345 is coupled through an amplifier 396 to an input terminal 397 of flip-flop 346, and to an input 399 of a binary-to-octal decoder 398. Decoder 398 further has inputs 400–404 and outputs 405–412. Binary-to-octal decoder 398 is constructed in a manner similar to binary-to-sexadecimal decoder 353, and is utilized to convert its binary number input to an octal output. The only distinction in the operation of the binary-to-octal decoder as compared to the binary-tosexadecimal decoder is that each of the AND gates in the octal decoder utilizes one more input than is necessary. This extra input of each AND gate is connected to a decoder activate input terminal 413.

The "0" output of flip-flop 345 is connected by means of an amplifier 414 to the input 400 of decoder 398, and by means of amplifier 414 and an amplifier 415 in series with an indicator 416 to the negative potential source 325. The "1" output of flip-flop 346 is connected by means of an amplifier 417 to an input 418 of flip-flop 347, and to input terminal 401 of decoder 398. The "0" output of flip-flop 346 is connected through an amplifier 419 to the input 402 of decoder 398, and through amplifier 419 and amplifier 420 in series with an indicator 421 to the negative potential source 325. The "1" output of flip-flop 347 is connected through an amplifier 422 to the input 403 of decoder 398. The "0" output of flip-flop 347 is connected through an amplifier 423 to the input 404 of decoder 398 and through amplifier 423 and an amplifier 424 in series with an indicator 425 to the negative potential source 325.

Figure 4:
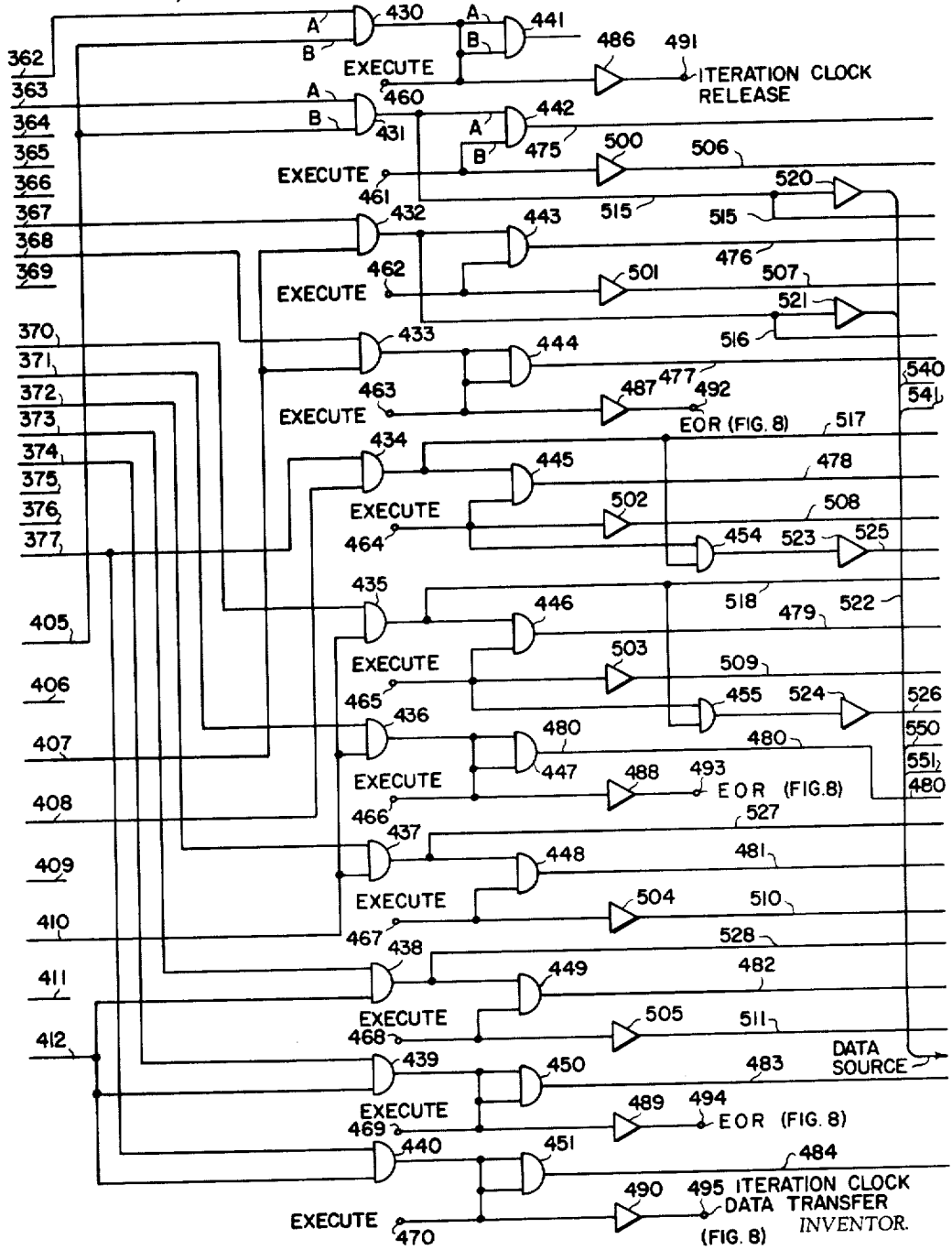

Referring to FIGURE 4 there is shown a plurality of AND gates 430–455 each having a first input A, a second input B and an output. For the sake of clarity the the A and B letter designations have been shown on AND gates 340, 431, 441, 443 and 452 only and it is to be understood that all of the AND gates 430–455 have similar A and B inputs.

The output lines 362–377 of sexadecimal decoder 353 and the output lines 405–412 of octal decoder 398 are shown in FIGURE 4. The outputs of sexadecimal decoder 353 and octal decoder 398 are combined to form a plurality of signal pairs, each signal pair comprising one output from the sexadecimal decoder and one output from the octal decoder. Since there are sixteen outputs from sexadecimal decoder 353 and eight outputs from octal decoder 398 the total possible number of signal pairs, utilizing one output of each decoder, is sixteen times eight or 128.

For example, the "0" output of sexadecimal decoder 353, appearing on line 362, and the "0" output of octal decoder 298, appearing on line 405, combine to form a signal pair, line 362 being connected to the A input of AND gate 430 and line 405 being connected to the B input of AND gate 430. Similarly, the "1" output of sexadecimal decoder 353, appearing on line 363, and the "0" output of octal decoder 398 combine to form a signal pair, line 363 being connected to the A input of AND gate 441, and line 405 being connected to the B input of AND gate 431. An other example, the "9" output of sexadecimal decoder 353, appearing on line 371, and the "5" output of octal decoder 398, appearing on line 410, combine to form a signal pair, line 371 being connected to the A input of AND gate 436 and line 410 being connected to the B input of AND gate 436.

It can be seen from the above discussion that each signal pair controls the inputs of a separate AND gate. Since, as explained previously, there are 128 possible signal pairs it is necessary to utilize 128 separate AND gates. For the sake of clarity, in FIGURE 4 only a representative number of the 128 AND gates is shown. However, it should be understood that in actual practice 128 AND gates would be utilized and that each of the 128 signal pairs would control the inputs to a separate AND gate.

The outputs of AND gates 430–440 are respectively connected to the A inputs of AND gates 441–451. A plurality of EXECUTE terminals 460–470 are adapted to receive EXECUTE signals from data sources in a manner to be described hereinafter. The B inputs of AND gates 441–451 are respectively connected to the EXECUTE terminals 460-470.

A few of the plurality of AND gates 441–451 have their A and B inputs connected together. These AND gates constitute END OF RECORD (EOR) positions.

AND gates 441, 444, 447, 450 and 451 are EOR positions. The purpose of EOR positions will be explained hereinafter. The outputs of AND gates 442–451 appear on output lines 475–484 respectively. Output lines 475–484 are also shown on FIGURES 5, 6 and 7.

EXECUTE terminals 460, 463, 466, 469 and 470 are respectively connected through their plurality of inverting amplifiers 486, 487, 488, 489 and 490 to a plurality of terminals 491, 492, 493, 494 and 495 respectively.

EXECUTE terminals 461, 462, 464, 465, 467 and 468 are respectively connected to a plurality of inverting amplifiers 500, 501, 502, 503, 504 and 505 to a plurality of output lines 506–511 respectively.

The outputs of AND gates 434 and 435 are respectively connected to the B inputs of AND gates 454 and 455 and are further respectively connected to output lines 517 and 518.

The EXECUTE terminal 464 is connected to the A input of AND gate 454, while the EXECUTE terminal 465 is connected to the A terminal of AND gate 455. The outputs of AND gates 454 and 455 are respectively connected through inverting amplifiers 523 and 524 to output lines 525 and 526 respectively. The outputs of AND gates 431 and 432 are respectively connected through inverting amplifiers 520 and 521 and are fed to control their respective data sources through a trunk line 522.

The outputs of AND gates 437 and 438 are connected to output lines 527 and 528 respectively.

Figure 5:
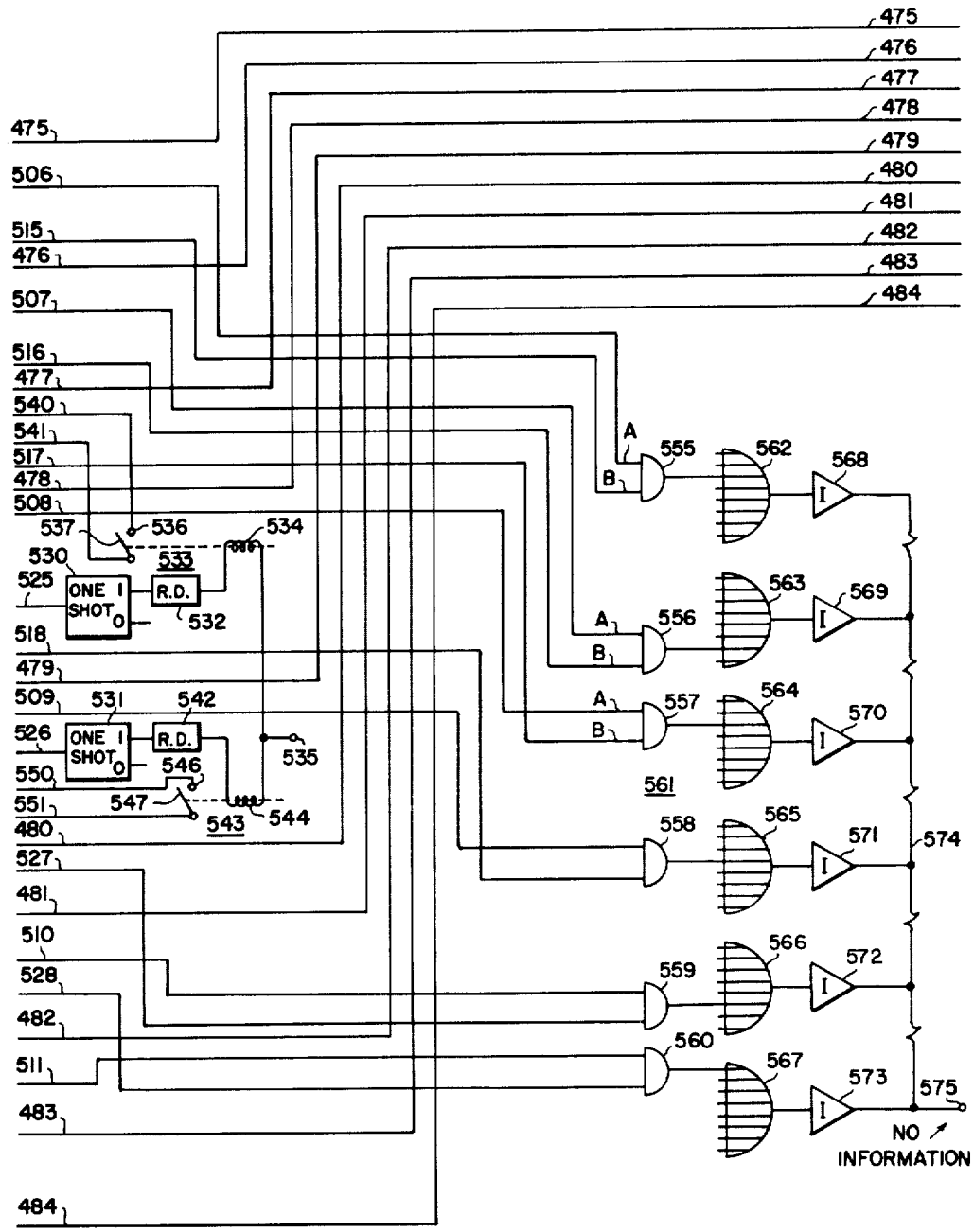

Referring to FIGURE 5, output lines 525 and 526 are connected to an input of a one-shot multivibrator 530 and an input of a one-shot multivibrator 531 respectively. A "1" output of one-shot multivibrator 530 is connected through a relay driver 532 in series with a winding 534 of a relay 533 to a negative potential source 535. Relay 533 has a fixed contact 536 and a normally open movable contact 537. A conductor 540 and a conductor 541 are respectively connected to fixed contact 536 and movable contact 537 of relay 533 and are adapted to be connected to a suitable data source in a manner to be described hereinafter.

The "1" output of one-shot multivibrator 531 is connected through a relay driver 542 in series with a winding 544 of a relay 543 to the negative potential source 535. Relay 543 further has a fixed contact 546 and a normally open movable contact 547. A conductor 550 and a conductor 551 are respectively connected to the fixed and movable contacts of relay 543 and are adapted to be connected to a data source in a manner to be described hereinafter.

A plurality of AND gates 555–560 each have an A input, a B input, and an output. For the sake of clarity the letter designations for the A and B inputs are shown on AND gates 555–557 only. However, it should be understood that each of the AND gates 555–560 has A and B inputs. AND gates 555–560 comprises a part of a NO INFORMATION gate 561.

For the sake of clarity, only AND gates 555–560 of the NO INFORMATION gate have been shown, however, it should be understood that each of the multiplexer positions except the EOR positions has a corresponding AND gate in the NO INFORMATION gate. The A inputs of AND gates 555–560 are connected to output lines 506–511 respectively. The B inputs of AND gates 555–558 are connected to output lines 515–518, respectively and the B inputs of AND gates 559 and 560 are connected to the output lines 527 and 528 respectively. A plurality of OR gates 562–567 each have a plurality of inputs and an output. The OR gates 562–567 also comprise a part of the NO INFORMATION GATE 561. The output of AND gates 555–560 are connected to one of the plurality of inputs of OR gates 562–567 respectively. The number of inputs required for the OR gates 562–567 is equal to the number of AND gates utilized in the NO INFORMATION gate, which, as explained previously, is equal to the total number of multiplexer positions less the number of EOR positions.

The outputs of OR gates 562–567 are connected through a plurality of inverting amplifiers 568–573 respectively to a common output line 574. Output line 574 is connected to a NO INFORMATION terminal 575.

Figure 6:
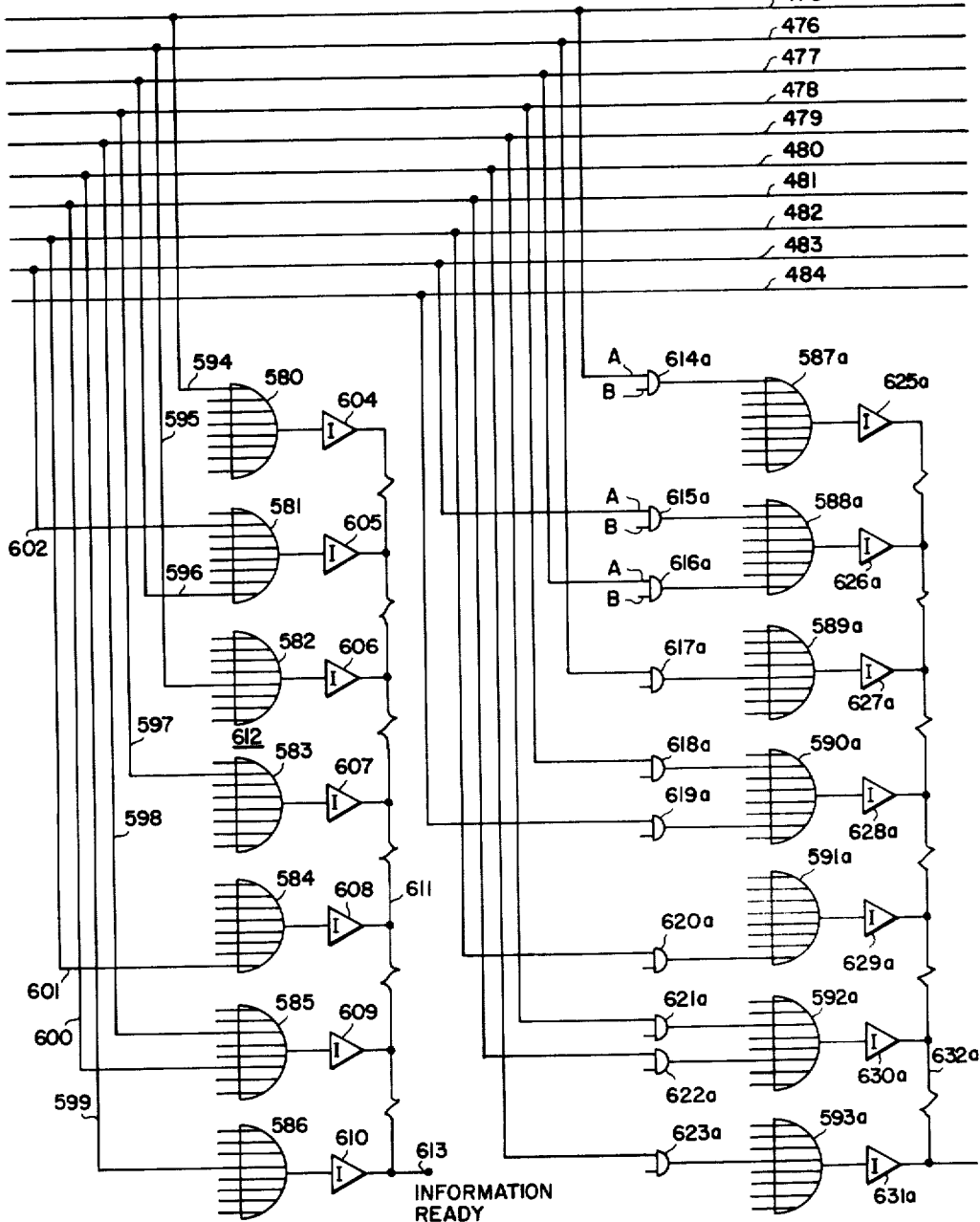

Referring to FIGURE 6 there is shown a plurality of OR gates 580–586 and 587a–593a, each having a plurality of inputs and an output. Output lines 475–483 are connected to inputs of OR gates 580–586 by means of conductors 594–602. For the sake of clarity, only a representative number of inputs of OR gates 580–586 have been shown as connected to a multiplexer gate position. However, it should be understood that the number of inputs required for OR gates 580–586 is equal to the number of multiplexer positions.

The outputs of OR gates 580–586 are connected through a plurality of inverting amplifiers 604–610 to a common output line 611. OR gates 580–586 and their associated circuitry comprise an INFORMATION READY gate 612, the output line 611 is connected to an INFORMATION READY terminal 613.

A plurality of AND gates 614a–623a each has an A input, a B input and an output. For the sake of clarity the A input and B input letter designations have been shown on AND gates 614a–616a only. However, it should be understood that all of the AND gates 614a–623a have A and B inputs. It should be further understood that while only AND gates 614a–623a are shown, that in actual practice for the embodiment being described there would be 128 such AND gates, one for each multiplexer position.

The B inputs of AND gates 614a–623a are adapted to be connected to respective data sources (not shown). The outputs of AND gates 614a–623a are respectively connected to one of the plurality of inputs of OR gates 587a–593a. The outputs of OR gates 587a–593a are respectively connected through a plurality of inverting amplifiers 625a–631a to a common output line 632a.

Figure 7:
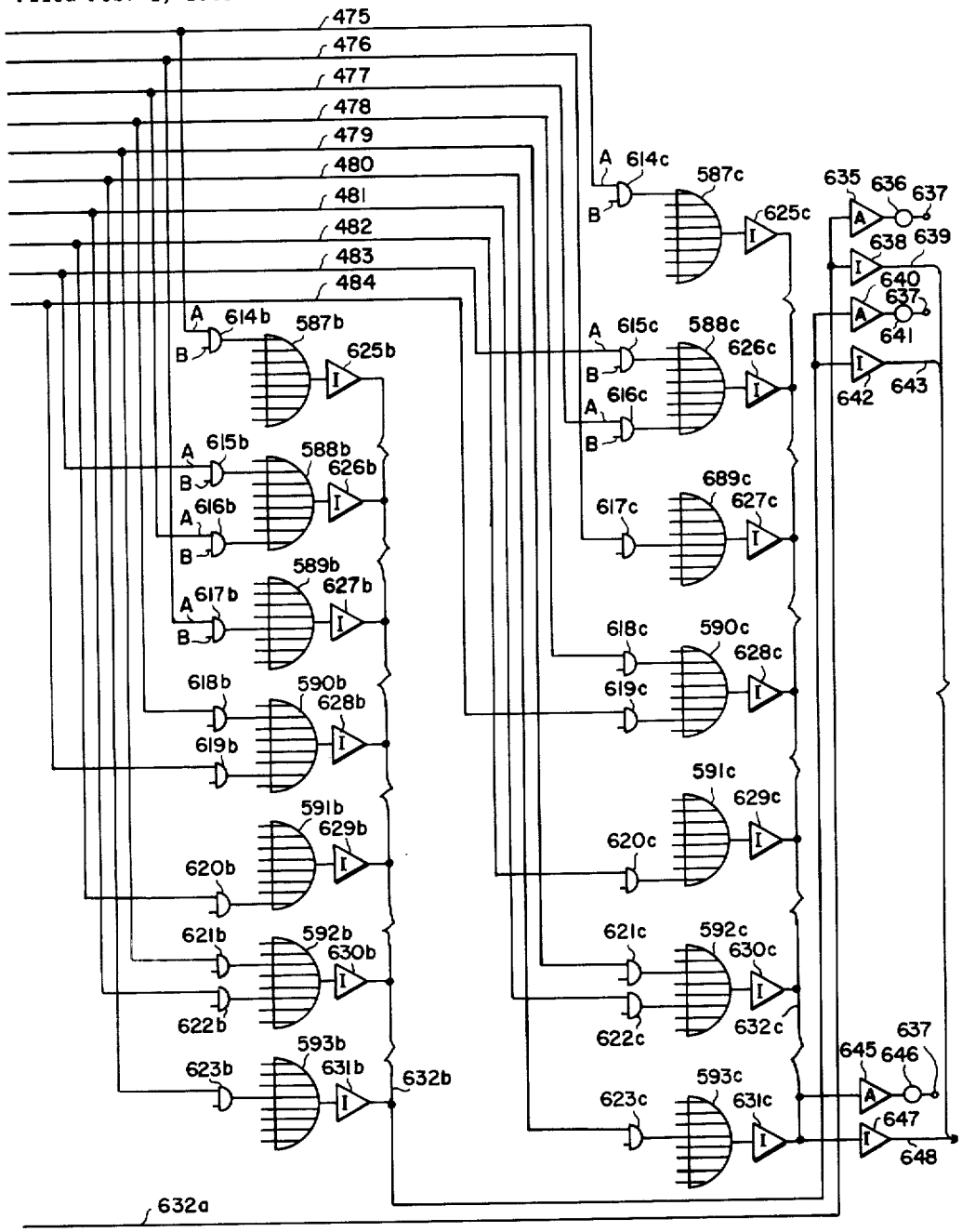

Referring to FIGURE 7 there is shown a plurality of AND gates 614b–623b and 614c–623c, each having an A input, a B input, and an output, and a plurality of OR gates 587b–593b and 587c–593c, each having a plurality of inputs and an output.

Output lines 475–484 are respectively connected to the A inputs of AND gates 614b–623b and are respectively connected to the A inputs of AND gates 614c–623c. As explained in conjunction with the description of AND gates 614a–623a, the B inputs of AND gates 614b–623b and the B inputs of AND gates 614c–623c are adapted to be connected to respective data sources (not shown).

Each group of AND gates having the same numerical designation forms a multiplexer data gate. For example, AND gates 614a, 614b, and 614c (see FIGURE 6) comprise a single data gate. The B inputs of these AND gates are adapted to be connected to a specific binary data source with each AND gate being connected to a separate "bit" of the binary signal from the data source. The number of AND gates utilized for each data gate is a matter of choice and depends largely upon the signal to be transferred, for example, a 48-bit binary signal would require 48 AND gates for each data gate. For the sake of clarity only three AND gates per data gate have been shown.

The outputs of AND gates 614b–623b are respectively connected to one of the plurality of inputs of OR gates 587b–593b while the outputs of AND gates 614c–623c are respectively connected to one of the plurality of inputs of OR gates 587c–593c.

The outputs of OR gates 587b–593b are respectively connected through a plurality of inverting amplifiers 625b–631b to a common output line 632b, while the outputs of OR gates 587c–593c are respectively connected through a plurality of inverting amplifiers 625c–631c to a common output line 632c.

Output line 632c is connected through an amplifier 635 in series with a "1" position indicator 636, in this case an indicator light, to a negative potential source 637, and is also connected through an inverting amplifier 638 to an output line 639. Similarly, output line 632b is connected through an amplifier 640 in series with a second position indicator 641 to the negative potential source 637, and is also coupled through an inverting amplifier 642 to an output line 643, while output line 632c is connected through an amplifier 645 in series with an nth position indicator 646 to the negative potential source 637, and through an inverting amplifier 647 to an output line 648. Output lines 639, 643 and 648 are adapted to be fed through a common trunk to the computer input circuit.

Figure 8:
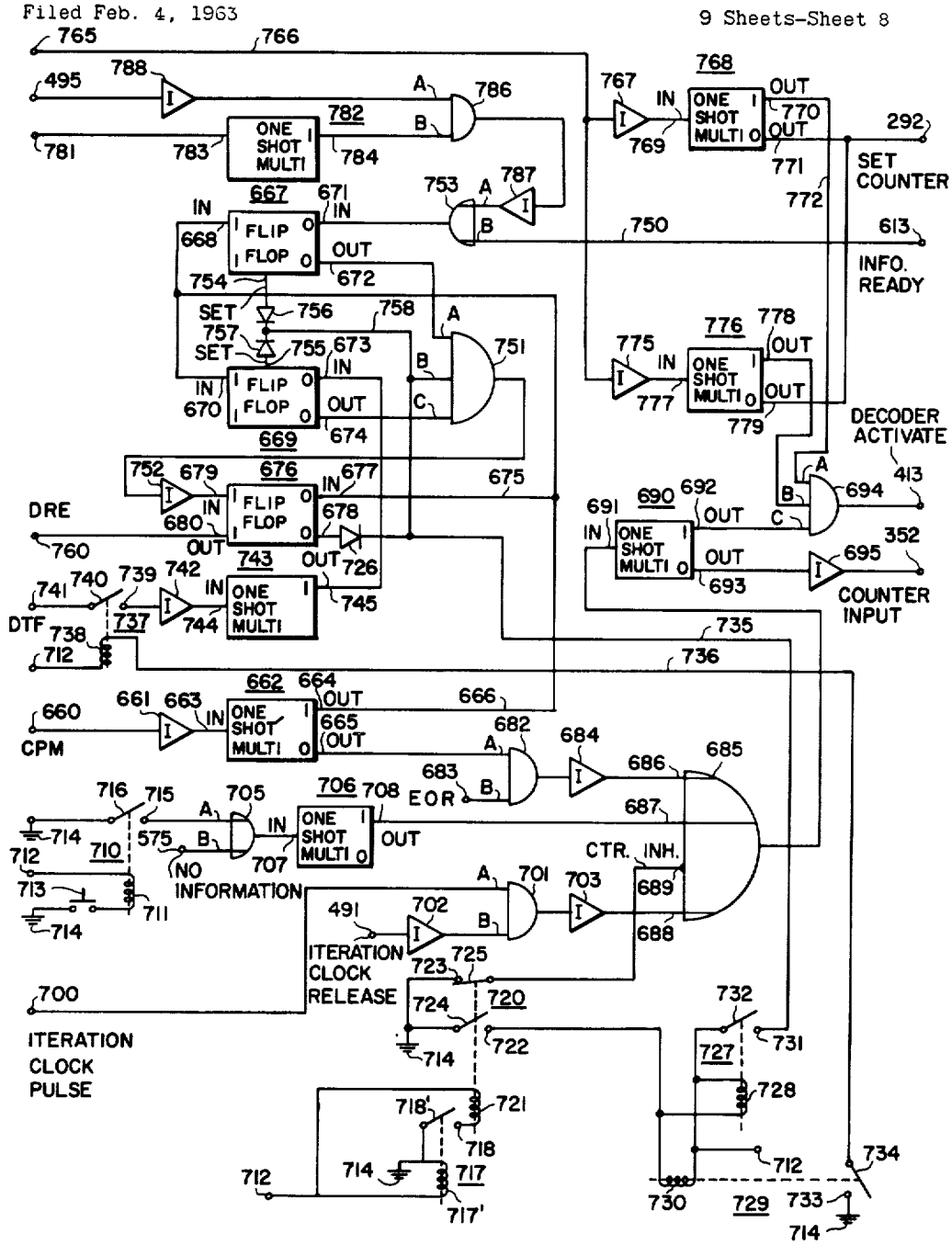

Referring to FIGURE 8 there is shown a CHANGE PERMISSIBLE (CPM) input 660 connected through an inverting amplifier 661 to an input terminal 663 of a one-shot multivibrtaor 662. One-shot multivibrator 662 further has a "1" output 664 and a "0" output 665. Output 664 of one-shot multivibrtaor 662 is connected through a conductor 666 to a "1" input 668 of a flip-flop 667 into a "1" input 670 of a flip-flop 669. Flip-flop 667 further has a "0" input 671 and a "0" output 672, while flip-flop 669 has a "0" input 673 and a "0" output 674. Output 664 of one-shot multivibrator 662 is further connected by means of conductor 666 and a conductor 675 to "0" input 677 of a flip-flop 676. Flip-flop 676 further has a "0" output 678, a "1" input 679 and a "1" output 680.

Output 665 of one-shot multivibrator 662 is connected to an A input of an AND gate 682. AND gate 682 further has a B input which is connected to an END OF RECORD (EOR) terminal 683 which is connected to the EOR outputs 492, 493, 494 and 495 of FIGURE 4. AND gate 682 further has an output which is connected through an inverting amplifier 684 to an input 686 of an OR gate 685. OR gate 685 further has an input 687, an input 688, an INHIBIT input 689, and an output. The output of OR gate 685 is connected to an input 691 of a one-shot multivibrator 690. One-shot multivibrator 690 further has a "1" output 692 and a "0" output 693. Output 692 of one-shot multivibrator 690 is connected to a C input of an AND gate 694. AND gate 694 further has an A input, a B input, and an output. The output of AND gate 694 is connected to the DECODER ACTIVATE terminal 413 (see FIGURE 3).

Output 693 of one-shot multivibrator 690 is connected through an inverting amplifier 695 to the COUNTER INPUT terminal 352 (see FIGURE 3).

An ITERATION CLOCK PULSE terminal 700 is connected to an A input of an AND gate 701. AND gate 701 further has a B input and an output. ITERATION CLOCK PULSE release terminal 491 (see FIGURE 4) is connected through an inverting amplifier 702 to the B input of AND gate 701. The output of AND gate 701 is connected through an inverting amplifier 703 to the input terminal 688 of OR gate 685.

The NO INFORMATION terminal 575 is connected to a B input of an OR gate 705. OR gate 705 further has an A input and an output. The output of OR gate 705 is connected through an input 707 of a one-shot multivibrator 706. One-shot multivibrator 706 further has a "1" output 708 which is connected to the input terminal 687 of OR gate 685.

A winding 711 of a relay 710 is connected from a negative potential source 712 through a push-button switch 713 to ground 714. Relay 710 further has a fixed contact 715 and a movable contact 716. Fixed contact 715 of relay 710 is connected to the A input of OR gate 705, while movable contact 716 of relay 710 is connected to ground 714.

A relay winding 717' of a relay 717 is connected from the negative potential source 712 to ground 714. Relay 717 further has a fixed contact 718 and a movable contact 718'. Movable contact 718' of relay 717 is connected to ground 714. A relay winding 721 of a relay 720 is connected from the negative potential source 712 to the fixed contact 718 of relay 717. Relay 720 further has a fixed contact 722, a fixed contact 723, a movable contact 724 operable to engage fixed contact 722, and a normally closed movable contact 725 operable to engage fixed contact 723. Fixed contact 723 and movable contact 724 of relay 720 are connected to ground 714. Movable contact 725 of relay 720 is connected to the INHIBIT input 689 of OR gate 685. Fixed contact 722 of relay 720 is connected through a relay winding 728 of a relay 727 in parallel with a relay winding 730 of a relay 729 to a negative potential source 712. Relay 727 further has a fixed contact 731 and a movable contact 732 while relay 729 further has a fixed contact 733 and a movable contact 734. Movable contact 732 of relay 727 is connected to the negative potential source 712, while fixed contact 731 of relay 727 is connected through a conductor 735 and a reverse-poled diode 726 to terminal 678 of flip-flop 676.

Fixed contact 733 of relay 729 is connected to ground 714, while movable contact 734 of relay 729 is connected through a conductor 736 in series with a relay winding 738 of a relay 737 to the negative potential source 712. Relay 737 further has a fixed contact 739 and a movable contact 740. Movable contact 740 of relay 737 is connected to the DATA TRANSFERRED (DTF) terminal 741. Fixed contact 739 of relay 737 is connected through an inverting amplifier 742 to an input 744 of a one-shot multivibrator 743. One-shot multivibrator 743 further has a "1" output 745 which is connected to input 673 of flip-flop 669.

The INFORMATION READY terminal 613 (see FIGURE 6) is connected by means of a conductor 750 to a B input of an OR gate 753. OR gate 753 further has an A input and an output. The output of OR gate 753 is connected to the input terminal 671 of flip-flop 667. Output terminal 672 of flip-flop 677 is connected to an A input of an AND gate 751. AND gate 751 further has a B input, a C input, and an output. The output of AND gate 751 is connected through an inverting amplifier 752 to the input 679 of flip-flop 676.

A SET input 754 of flip-flop 667 and a SET input 755 of flip-flop 669 are connected by means of diodes 756 and 757 respectively to a conductor 758. Conductor 758 is connected to the B input of AND gate 751 and to conductor 735.

The "0" output 674 of flip-flop 669 is connected to the C input of AND gate 751. The "1" output terminal 680 of flip-flop 676 is connected to a DATA READY (DRE) terminal 760.

An input terminal 765 is connected by means of a conductor 766 and an inverting amplifier 767 to an input 769 of a one-shot multivibrator 768. One-shot multivibrator 768 further has a "1" output 770 and a "0" output 771. Output 770 of one-shot multivibrator 768 is connected by means of a conductor 772 to the A input of AND gate 694, while output 771 of one-shot multivibrator 768 is connected to the SET COUNTER terminal 292 (see FIGURE 3).

Conductor 766 is further connected through an inverting amplifier 775 to an input 777 of a one-shot multivibrator 776. One-shot multivibrator 776 further has a "1" output 778 and a "0" output 779. Output 778 of one-shot multivibrator 776 is connected to the B input of AND gate 694, while output 779 of one-shot multivibrator 776 is connected to the SET COUNTER terminal 292 (see FIGURE 3). The ITERATION CLOCK DATA TRANSFER terminal 495 (see FIGURE 4) is connected through an inverting amplifier 788 to an A input of an AND gate 786. AND gate 786 further has a B input and an output. An input terminal 781 is connected to an input 783 of a one-shot multivibrator 782. One-shot multivibrator 782 has a "1" output 784 which is connected to the B input of AND gate 786. The output of AND gate 786 is connected through an inverting amplifier 787 to the A input of OR gate 753.

Figure 9:
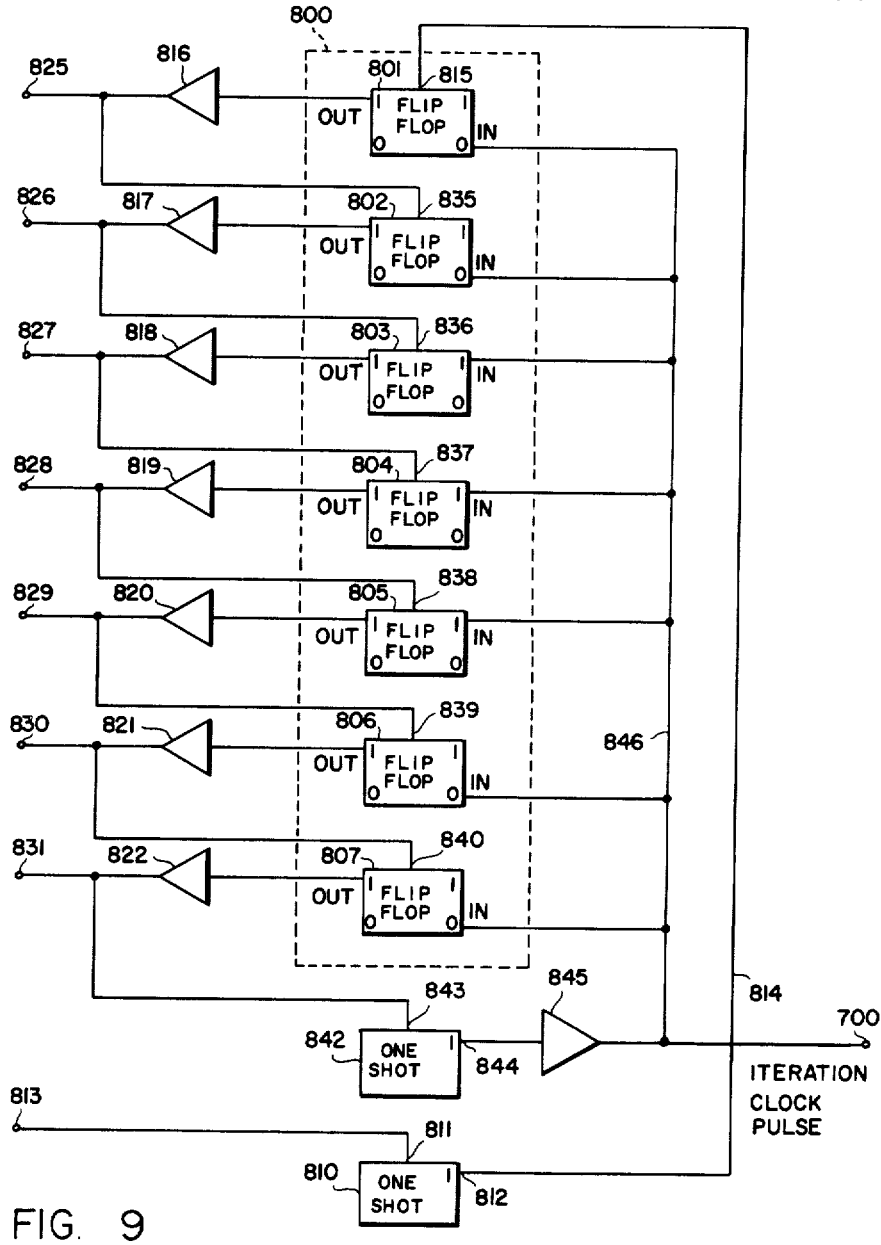

Referring to FIGURE 9, there is shown a seven-bit binary counter 800 comprising seven flip-flops 801–807, with flip-flop 801 being the lowest order bit and flip-flop 807 being the highest order bit. Each of the flip-flops 801–807 has a "1" input and a "0" input and a "1" output and a "0" output.

A one-shot multivibrator 810 has an input 811 and a "1" output 812. The input 811 of one-shot multivibrator 810 is connected to an input terminal 813 which is adapted to be connected to a source of input pulses (not shown). The output 812 of one-shot multivibrator 811 is connected by means of a conductor 814 to a trigger input 815 of flip-flop 801. The "1" outputs of flip-flops 801–807 are respectively connected through a plurality of amplifiers 816–822 to a plurality of output terminals 825–831 respectively. The outputs of amplifiers 816–821 are further respectively connected to a plurality of trigger inputs 835–840 of flip-flops 802–807.

The output of amplifier 822 is connected to an input 843 of a one-shot multivibrator 842. One-shot multivibrator 842 further has a "1" output 844. Output 844 of one-shot multivibrator 842 is connected through an amplifier 845 to the iteration clock pulse terminal 700 (see FIGURE 8). The output of amplifier 845 is further connected to the "0" input of flip-flops 801, 802, 806 and 807, and to the "1" inputs of flip-flops 803, 804 and 805.

*Operation of FIGURES 3–9*

Referring to FIGURE 3, as a pulse signal is received at the counter input terminal 352 it is transmitted through conductor 351 to input 350 of counter 340 and the counter will increment by one count. These advance counter pulses are supplied by the CONTROL CIRCUIT (FIGURE 8).

The position of counter 340 can also be controlled by the gating circuit connected to the "1" and "0" inputs of the flip-flops 341–347 of counter 340. This control may be either manual or automatic. The counter flip-flops may be manually set to any configuration by setting the test mode switch 338 to the manual position, setting the counter position switches 320, 327, 330 or 331 to the binary configuration of the desired position, and pressing the COUNTER SET button 321 or 332.

For example, to set flip-flop 341 of counter 340 to the "1" state the test mode switch 338 would be set to the manual position thereby energizing relay winding 318 from battery 337 and closing relay contacts 312'–317'. The "1" switch 320 is closed and the COUNTER SET switch 321 is depressed thereby causing the negative potential source 325 to be connected through switch 321, switch 320, relay contact 312', and conductor 310 to the B input of OR gate 295. The output from OR gate 295 is fed to the "1" input of flip-flop 341 of counter 340 thereby setting flip-flop 341 to its binary "1" state. If it is desired to set flip-flop 341 to the binary "0" state then the "0" switch 327 should be closed, rather than the "1" switch 320. When the COUNTER SET switch 321 is depressed the negative potential source 325 will then be connected through switch 321, switch 327, relay contact 313' of relay 311, and conductor 326 to the B input of OR gate 296. The output of OR gate 296 is fed to the "0" input of flip-flop 341 thereby setting flip-flop 341 to its binary "0" state.

The counter can be automatically positioned to any desired count by means of a suitable input control source (not shown) such as a computer connecter to input lines 275–281. The binary input information appearing on input lines 275–281 is connected to the A inputs of AND gates 260, 262, 264, 266, 268, 270 and 272 respectively and is further inverted by inverting amplifiers 283–289 and is fed to the A inputs of AND gates 261, 263, 265, 267, 269, 271 and 273. The D inputs of AND gates 260–273 are normally deactivated and are activated by a signal from the control circuit (FIGURE 8) which appears at SET COUNTER input terminal 292 and is coupled to the B inputs of the AND gates 260–273 respectively. When the B inputs of AND gates 260–273 are activated the AND gate having a binary "1" at its A input will produce an output which will be coupled through its associated OR gates 295–308 to the binary "1" or "0" input of flop-flops 341–346 of counter 340.

For example, assume that the binary input signal 0001010 is applied to terminals 275–281, the highest order bit being applied to terminal 281 and the lowest order bit being applied to terminal 275. In this example, the "0" signal appearing at terminal 275 would be coupled to the A input of AND gate 260 and would also be inverted by inverting amplifier 283 and would appear as a "1" signal at the A input of an AND gate 261. The "1" signal appearing at input terminal 276 would be coupled to the A input of AND gate 262 and would be inverted by inverting amplifier 284 and would appear as a "0" signal at the A input of AND gate 263. The "0" signal appearing at terminal 277 would be applied to the A input of AND gate 264 and would be inverted by inverting amplifier 285 and would appear as a binary "1" signal at the A input of AND gate 265. The "1" signal appearing at terminal 278 would be applied to the A input of AND gate 266 and would be inverted by inverting amplifier 286 and would appear as a binary "0" signal at the A input of AND gate 267. Similarly, the "0" signals appearing at input terminals 279, 280 and 281 would be coupled to the A input of AND gates 268, 270 and 272 and would be inverted by inverting amplifiers 287, 288 and 289 and would appear as a binary "1" signal at the A input of AND gates 269, 271 and 273. It can therefore be seen that a binary "1" signal will appear at the A inputs of AND gates 261, 262, 265, 266, 269, 271 and 273, while a binary "0" signal will appear at the A input of AND gates 260, 263, 264, 267, 268, 270 and 272. When the B inputs of AND gates 260–273 are activated by a signal appearing at SET COUNTER terminal 292, AND gates 261, 262, 265, 266, 269, 271 and 273 will produce an output which will be coupled to the A inputs of OR gates 296, 297, 300 301, 304, 306 and 308 respectively. The output of OR gate 296 is fed to the "0" input of flip-flop 341 thereby setting 341 to its "0" state. The output signal from OR gate 297 is fed to the "1" input of flip-flop 342 thereby setting flip-flop 342 to its "1" state. The output of OR gate 300 is fed to the "0" input of flip-flop 343 thereby setting flip-flop 343 to its "0" state while the output of OR gate 301 is fed to the "1" input of flip-flop 344 thereby setting flip-flop 344 to its "1" state. The outputs of OR gates 304, 306 and 308 are fed to the "0" inputs of flip-flops 345, 346 and 347 thereby setting these flip-flops to their "0" state. From the above discussion it can be seen that the flip-flops of counter 304 are now set to the identical states represented by the binary number input applied to input terminals 275–281.

The outputs of flip-flops 341–347 of counter 340 are coupled to the inputs of a decoder. The "0" output of flip-flops 341–347 are also coupled through amplifiers 379, 384, 389, 394, 415, 420 and 424 respectively to suitable indicators, for example, a neon light, 380, 385, 390, 395, 416, 421, and 425 to provide a visual indication of the binary count in counter 340.

The four lower order bits of counter 340, that is flip-flops 341–344 are coupled to the input of a binary-to-sexadecimal decoder 353, as was explained in conjunction with the operation of FIGURE 2, while the higher order bits of counter 340, that is, flip-flops 345–347 are coupled to the inputs of a binary-to-octal decoder 398.

As explained in conjunction with the description of FIGURE 2, the binary output of the lower order bits of counter 340 are fed to the input of sexadecimal decoder 353 and are converted into an equivalent number in a number system having a radix of 16. For example, assuming, as explained previously, that flip-flop 341 is in the "0" state, 342 is in the "1" state, 343 is in the "0" state and 344 is in the "1" state, or in other words, the count in flip-flops 341–344 will be coupled through sexadecimal decoder 353 and an output pulse will appear at output terminal 372 of sexadecimal decoder 353. Output 372 represents the "10" position of decoder 353.

Similarly, the output of the higher order bits 345–347 of counter 340 are fed to the input of binary-to-octal decoder 398. Decoder 398 operates in the same manner as the sexadecimal decoder described in conjunction with FIGURE 2. In other words, assuming that flip-flops 345–347 are all in the "0" state then the output of binary-to-octal decoder 398 will appear at terminal 405 which corresponds to the "0" position of decoder 398. One distinction between the octal decoder 398 and sexadecimal decoder 353 is that octal decoder 398 has an extra input to each of its AND gates which are connected to a common DECODER ACTIVATE terminal 413. The DECODER ACTIVATE terminal is utilized to deactivate the octal decoder during the time when the counter 340 is changing position. This is necessary in order to insure that an invalid position is not sensed by the decoder during counter transient times.

The outputs of the sexadecimal decoder 353 and the octal decoder 398 are combined to form a plurality of signal pairs, one signal pair having one signal from each decoder. In the example being described, since decoder 353 is a sexadecimal decoder and decoder 398 is an octal decoder the total possible number of signal pairs is 128. For the sake of clarity in the drawings, only a few of the signal pairs formed by the combination of outputs from sexadecimal decoder 353 and octal decoder 398 are shown. For example, the "0" output 362 of sexadecimal decoder 353 and the "0" output 405 of octal decoder 398 combine to form a first signal pair and are respectively connected to the A and B inputs of AND gate 430 (see FIGURE 4). Similarly, the "1" output 363 of sexadecimal decoder 353 and the "0" output 405 of octal decoder 398 combine to form a second signal pair and are respectively connected to the A and B inputs of AND gate 431. The "5" output 367 of sexadecimal decoder 353 and the "2" output 407 of octal decoder 398 combine to form another signal pair and are respectively connected to the A and B inputs of AND gates 432.

Assume that the binary input to sexadecimal decoder 353 is such that a pulse appears at the "1" output 363 of decoder 353, and at the same time the binary input to octal decoder 398 is such that a pulse appears on the "0" output 405 of octal decoder 398. The outputs from decoders 353 and 398 are fed to the A and B inputs respectively of AND gate 431 thereby enabling AND gate 431 and producing a signal at the output of gate 431. The output signal of AND gate 431 is fed to the A input of AND gate 442. The B input of AND gate 442 is connected to the EXECUTE terminal 461, which in turn is adapted to be connected to the specific data source connected to the data gate which is controlled by a control gate comprising AND gates 431 and 442. A signal will appear at the EXECUTE terminal 461 when a specific data source has an information word ready for transfer through the data gate. If the EXECUTE signal is present at terminal 441 the signal will be coupled to the B input of AND gate 442 and, if there is an output from AND gate 431, an output signal will appear at the output of AND gate 442. The output signal of AND gate 442 appears on output line 475 and is coupled through conductor 475 and conductor 594 (see FIGURE 6) to an input of OR gate 580. This signal will appear at the output of OR gate 580 and will be inverted by inverting amplifier 604 and fed through conductor 611 to the INFORMATION READY terminal 613. From the INFORMATION READY terminal 613 the signal will be coupled to the control circuit (see FIGURE 8) as will be described hereinafter. The signal appearing on output conductor 475 is also coupled to the A input of AND gates 614a (see FIGURE 6), 614b (see FIGURE 7), and 614c. The B inputs of AND gates 614a, 614b and 614c are connected to the data source, each of the B inputs of the AND gates 614a, 614b and 614c, being connected to separate "bits" of the binary information word to be transferred. Since signals appear at both the A and B inputs of AND gates 614a, 614b and 614c, output signals will appear at the outputs of these AND gates which are respectively coupled through OR gates 587a, 587b and 587c and inverting amplifiers 625a, 625b and 625c to conductors 632a, 632b and 632c.

Output lines 632a, 632b and 632c are respectively connected through inverting amplifiers 638, 642 and 647 to the multiplexer output where they are adapted to be connected to a load, for instance, the input unit of the computer. In addition, output lines 632a, 632b asd 632c are respectively connected through amplifiers 635, 640 and 645, to indicators 636, 641 and 646 so as to give a visual indication of the multiplexer output.

Referring again to FIGURE 4, assume that the EXECUTE signal at EXECUTE terminal 461 is not present, indicating that the data source associated with data gates 614 has no information ready for transfer. In this case the output from AND gate 442 will be logical "0" and the data gate comprising AND gates 614a, 614b and 614c will remain closed. Similarly, the INFORMATION READY signal from terminal 613 will not be generated. When there is no EXECUTE signal at EXECUTE terminal 461 the output of inverting amplifier 500 will be a logical "1" and this signal will be transferred through conductor 506 to the A input of AND gate 555 (see FIGURE 5). At the same time, the logical "1" output of AND gate 431 (see FIGURE 4) will be transferred through conductor 515 to the B input of AND gate 555 (see FIGURE 5). Since there is a logical "1" present at both the A and B inputs of AND gate 555 a logical "1" will appear at the output of this AND gate and will be coupled through OR gate 562 and inverting amplifier 568 and will be transferred through conductor 574 to the NO INFORMATION terminal 575. NO INFORMATION terminal 575 is connected to the control circuit (see FIGURE 8) and the purpose of this signal will be explained hereinafter.

Some of the multiplexer positions are END OF RECORD (EOR) positions. During the scanning operation the multiplexer sequentially steps from position to position. When the multiplexer reaches an EOR position the scanning operation stops and the multiplexer remains in the EOR position until it receives a signal from an outside source, such as the computer, telling it to continue scanning.

The gating control positions comprising AND gates 444, 447 and 450 are EOR multiplexer positions and are distinguished from normal multiplexer positions in that the EXECUTE inputs are connected to the outputs of the signal pair AND gates 433, 436 and 439. In other words, AND gates 444, 447 and 450 receive their EXECUTE signal from the signal pair AND gates 433, 436 and 439 rather than from the data sources connected to their respective data gates, as is the case for the normal multiplexer positions.

As an example of the operation of an EOR position, assume that the inputs to decoders 353 and 398 are such that output signals appear at the "6" output 368 of the decoder 353 and at the "2" output 407 of the decoder 398. These signals are coupled with the A and B inputs respectively of AND gate 433. The output of AND gate 433 is fed to the A and B inputs respectively of AND gate 444. The output of AND gate 444 appears on output conductor 477 and is coupled to the A input of AND gates 616a, 616b and 616c thereby enabling these AND gates in a manner similar to that described for the normal multiplexer positions.

The output of AND gate 433 is also coupled through inverting amplifier 487 to the EOR terminal 492. EOR terminal 492 is further connected to the control circuit (FIGURE 8), and will be described more fully.

In some instances it might be necessary for certain data sources to require a signal from the multiplexer to the time their information has transferred through the multiplexer to the computer input. This signal would be used by the data source to prevent the information lines from changing while a word is being transferred to the computer input. For instance, when the multiplexer is in position "1," in other words, there is a signal appearing on the "1" output 363 of decoder 353 and a signal appearing at the "0" output 405 of decoder 398, the output of AND gate 431 sends a logical "1" signal to the input of inverting amplifier 520 where it is inverted and fed through trunk lines 522 to the DATA SOURCE output. This signal can be used by the data source to freeze the information lines to the multiplexer data gates for subsequent multiplexer positions. For instance, when the multiplexer is in position "1" the signal sent to the data source could be used to freeze the information lines for the data gates of position 5–11 so that this information cannot change during the transfer time.

In some instances it may be required that the information from certain data sources be transferred to the computer input only once. In order to insure this an EXECUTE RELEASE circuit, comprising one-shot multivibrator 530, relay driver 532, relay 533, AND gate 454, and inverting amplifier 523, provides a signal to the data source when the information from that data source has been transferred to the computer input. The data source can use the signal to return its EXECUTE line to a logical "0" before the multiplexer returns to the data source position.

The operation of the EXECUTE release circuit is as follows: when the outputs of decoders 353 and 398 are such that signals appear at the A and B inputs of AND gate 434 the output of AND gate 434 will be a logical "1" signal which is fed to the B input of AND gate 454. The EXECUTE input 464 is connected to the A input of AND gate 454. If the EXECUTE input is a logical "1" at the time the output of AND gate 434 is a logical "1" then the output of AND gate 454 will be a logical "1." The output of AND gate 454 is inverted by inverting amplifier 523 and is fed through output conductor 525 to the input of one-shot multivibrator 530 (see FIGURE 5). When the input to one-shot multivibrator 530 changes from a logical "1" to a logical "0," one-shot multivibrator 503 is activated. When one-shot multivibrator 530 is activated, the output is amplified by the relay driver 532 and the output of relay driver 532 drives relay 533. The "1" side output of one-shot multivibrator 530 becomes a logical "0" and this signal is amplified by the relay driver 532 which in turn energizes winding 534 of relay 533 thereby closing relay contacts 536 and 537. The closing of relay contacts 536 and 537 provides information to the data source which can be used to return the data source EXECUTE signal to the logical "0" state. The closing of relay contacts 536 and 637 completes contact between conductors 540 and 541 which are fed through trunk line 522 to the DATA SOURCE output.

Referring to FIGURE 8, the CHANGE PERMISSIBLE (CPM) input 660 is adapted to receive a signal each time an information word has been transferred through the multiplexer data gates. Each time the CPM input changes from a logical "0" to a logical "1" this signal is inverted by inverting amplifier 661 and is fed to the input 663 of one-shot multivibrator 662. The "0" output of one-shot multivibrator 662 is fed to the A input of AND gate 682. The signal into the B input of AND gate 682 is provided by the END OF RECORD (EOR) outputs 492, 493 and 494 (see FIGURE 4) connected to the EOR input 683.

When the multiplexer is not in an EOR position, the signal at the B input of AND gate 682 is a logical "1." When one-shot multivibrator 662 is triggered, the "0" output changes to a logical "1" level for a predetermined period. If the multiplexer is not in an EOR position at this time, the logical "1" pulse output by one-shot multivibrator 662 will be transferred through AND gates 682 and will be inverted by inverting amplifier 684. The output of inverting amplifier 684 is fed through OR gate 685 and is fed to the input 691 of one-shot multivibrator 690 thereby triggering multivibrator 690. The "0" output of one-shot multivibrator 690 is inverted by inverting amplifier 695 and is sent to the COUNTER INPUT terminal 352 and from the COUNTER INPUT terminal 352 through conductor 351 to the input 350 of counter 340, thereby causing counter 340 to increment one position.

If the multiplexer is in an EOR position when one-shot multivibrator 662 is triggered by the CPM input, the signal at input B of AND gate 682 will be a logical "0" and the output of one-shot multivibrator 662 will not be transferred through AND gate 682. The multiplexer will now remain in the EOR position until the counter 340 (FIGURE 3) is repositioned.

When the NO INFORMATION signal from the NO INFORMATION terminal 575 is fed into input B of OR gate 705 the position counter 340 may also be advanced. The NO INFORMATION input 575 is normally at a logical "1" level. When the multiplexer arrives at a data source position which has no information to transfer, the NO INFORMATION signal is changed to a logical "0." This signal change triggers one-shot multivibrator 706 and the "1" output of one-shot multivibrator 706 becomes a logical "0" for a predetermined period. This pulse is transferred through OR gate 685 and triggers one-shot multivibrator 690 which again causes counter 340 to increment one position.

Another counter advance position exists when the A input of OR gate 705 is controlled by relay 710. The signal at the A input of OR gate 705 is normally a logical "1." When the counter advance button 713 is depressed, winding 711 of relay 710 is energized from the potential source 712 and movable contact 716 makes connection with fixed contact 715 thereby changing the A input of OR gate 705 to a logical "0." The counter 340 then advances in the same manner as described for the NO INFORMATION signal.

The ITERATION CLOCK RELEASE terminal 491 in the gating control circuit for the multiplexer position "0" (see FIGURE 4) is normally at a logical "1." This signal is coupled from terminal 491 through inverting amplifier 702 (see FIGURE 8) to the B input of AND gate 701. When the multiplexer is in position "0" the signal at terminal 491 becomes a logical "0." The ITERATION CLOCK PULSE appears at the ITERATION CLOCK PULSE input 700. This signal occurs once each second, and is coupled to the A input of AND gate 701. The signal applied to the A input of AND of AND gate 701 is normally a logical "0" and becomes a logical "1" during the iteration pulse period.

If the multiplexer is not in position "0" when the iteration pulse is generated, the output of inverting amplifier 702 will be a logical "0" and would prevent the iteration pulse from being transferred through AND gate 701. If the multiplexer is in position "0," the iteration pulse will be transferred through AND gate 701, inverting amplifier 703, and OR gate 685 to trigger one-shot multivibrator 690, the output of one-shot multivibrator 690 causing counter 340 to increment one position. The multiplexer is normally set to position "0," by means of inputs 275–281 (see FIGURE 3), after the multiplexer has completed a read cycle. It remains in position "0" until the iteration pulse advances counter 340 and begins a new read cycle. In this manner the system operation is maintained on a one-second iteration cycle.

The COUNTER INHIBIT (CTR INH) input of OR gate 685 is controlled by relay 720. When the multiplexer power is turned on, a logical "0" appears on the CTR INH line of OR gate 685 and prevents the gate from transmitting spurious signals to one-shot multivibrator 690. When the multiplexer power is turned on winding 717' of relay 717 is energized thereby closing relay contacts 718 and 718'. When relay contacts 718 and 718' make connection, relay winding 721 of relay 720 is energized thereby opening movable contact 725 of relay 720 and closing movable contact 724. The pull-in time of relay 718 is long enough to allow all transients and spurious signals to die out after the initiation of power before relay 720 is energized and contact 725 opens thereby removing the inhibit signal from OR gate 685.

In order to set the position counter 340, the AND gates into the counter flip-flops must be activated (see FIGURE 3). In their quiescent state, one-shot multivibrators 768 and 776 (see FIGURE 8) develop a level to deactivate the gating circuit of counter 340. Input terminal 765 is adapted to receive a control signal from a suitable input control source when the position counter 340 is to be positioned. When the counter 340 is to be positioned input terminal 765 changes from a logical "0" to a logical "1" and this signal is inverted by inverting amplifiers 767 and 775 respectively and fed to the inputs of one-shot multivibrators 768 and 776 respectively thereby activating these multivibrators. The resultant output signals on the "0" outputs of one-shot multivibrators 768 and 776 are fed to the SET COUNTER terminal 292 and from terminal 292 to the B inputs of AND gates 260–273 respectively thereby activating the counter gates.

The DECODER ACTIVATE signal for binary-to-octal decoder 398 is generated in the following manner. The counter 340 can only change position when one-shot multivibrators 768, 776 or 690 are activated. When the one-shot multivibrators are in the quiescent state, the "1" output of each is a logical "1" and this signal is coupled to the A, B and C inputs respectively of AND gate 694, thereby enabling AND gate 694 and the logical "1" output of AND gate 694 is fed to the DECODER ACTIVATE terminal 413, and from terminal 413 to decoder 398. When one of the one-shot multivibrators 768, 776 or 690 is triggered, the output signal from the "1" output becomes a logical "0." This signal is coupled to AND gate 694 thereby causing the output of AND gate 694 to become a logical "0" thereby deactivating the octal decoder 398 and permitting position counter 340 to change position.

The following discussion will describe the generation of the DRE signal, which appears at DRE terminal 760, from the time power is turned on. When power is first turned on, the D.C. set inputs 678, 755 and 754 of flip-flops 676, 669 and 667 respectively are connected to the negative potential source 712 through diodes 726, 757 and 756 respectively, and the contacts 731 and 732 of relay 727. When power is turned on, relay 727 is energized by the closing of contacts 722 and 724 of relay 720, and the D.C. set inputs of the flip-flops are opened. However, as mentioned previously, the pull-in time of relays 717 and 720 is much longer than is required to set the flip-flops 676, 669 and 667. Flip-flops 667 and 669 are initially set to the "1" state and flip-flop 676 to the "0" state. The "0" outputs of flip-flops 667 and 669 are respectively connected to the A and C inputs of AND gate 751, and are in the logical "0" state. The "1" output of flip-flop 676, a logical "0" at this time, is fed to the DRE terminal 760. When these conditions are met, the multiplexer can be set to a specific data source position. If an information word is to be transferred through the multiplexer data gates at this time the INFORMATION READY signal will be received from the INFORMATION READY terminal 613 and will be applied to the B input of OR gate 753. At this time, the output of OR gate 753 changes from a logical "1" to a logical "0" and sets flip-flop 667 to the "0" state. The "0" output of flip-flop 667 becomes a logical "1" and is sent to the A input of AND gate 751. AND gate 751 output is held at the logical "0" level by the "0" output of flip-flop 669 at input C of AND gate 751.

The DATA TRANSFERRED (DTF) input 741 is adapted to receive a signal whenever the load device, for example, the input of a computer, is ready to accept an information word. The DTF input is normally at a logical "0" level and changes to a logical "1" when an information word cannot be transferred. The DTF signal is coupled through contacts 739 and 740 of relay 737, which was energized when power was turned on, to the input of an inverting amplifier 742. The output of inverting amplifier 742 changes from a logical "1" to a logical "0" and triggers one-shot multivibrator 743. The "1" output of one-shot multivibrator 743 changes from a logical "1" to a logical "0" for a predetermined period. This signal sets flip-flop 669 to the "0" state and applies a logical "1" to the C input of AND gate 751. The output of AND gate 751 changes from a logical "0" to a logical "1." This output is inverted by inverting amplifier 752 and sets flip-flop 676 to the "1" state. Flip-flop 676 produces a logical "1" at the DRE terminal 760.

As explained previously, when an information word has been accepted by the load device, in this case, a computer input circuit, a signal is sent to the CPM terminal 660. When the CPM signal changes from a logical "0" to a logical "1," the output of inverting amplifier 661 changes from a logical "1" to a logical "0" this signal triggers one-shot multivibrator 662. The "1" output of one-shot multivibrator 662 changes from a logical "1" to a logical "0" for a predetermined time. This signal is coupled to the inputs 668, 670 and 677 of flip-flops 667, 669 and 676, respectively and sets flip-flops 667 and 669 to the "1" state and flip-flop 676 to the "0" state. This process is repeated each time an information word is transferred through the multiplexer to the computer input.

FIGURE 9 shows a logic diagram of the iteration clock circuit. The iteration clock operates on a one-second cycle, that is, the iteration clock pulse appears at the ITERATION CLOCK PULSE output terminal 700 once each second. The operation of the iteration clock circuit is as follows: Input terminal 813 is adapted to receive input pulses from a pulse source (not shown) having a frequency of 100 pulses per second. The input pulses at terminal 813 are coupled to the input 811 of one-shot multivibrator 810. One-shot multivibrator 810 produces an output pulse at its "1" output 812 each time an input pulse is received. The output pulses from one-shot multivibrator 810 are coupled through conductor 814 to the trigger input 815 of the lowest order bit flip-flop 801 of counter 800. Counter 800 is set so that it originally has account of 28. Therefore, the pulses applied to trigger terminal 815 cause counter 800 to begin counting upward from its original count of 28. Since counter 800 is a seven-bit counter its maximum count is 128, that is, on the 128th input pulse the counter will be reset to 0. When counter 800 resets to 0, flip-flop 807 changes from the "1" state to the "0" state and an output signal appears at the "1" output of flip-flop 807 and is coupled through amplifier 822 to the input 843 of one-shot multivibrator 842, thereby causing one-shot multivibrator 842 to produce an output pulse at its output 844. The output pulse of one-shot multivibrator 842 is coupled through amplifier 845 to the ITERATION CLOCK PULSE output terminal 700 and is further coupled through conductor 846 to the "0" inputs of flip-flops 801, 802, 806 and 807, and to the "1" inputs of flip-flops 803, 804 and 805, thereby setting the counter 800 to a count of 28. It can be seen that since counter 800 begins its count from a count of 28 it requires only 100 input pulses to trigger input 815 of flip-flop 801 to cause counter 800 to reach its maximum count and return to 0. Since the frequency of the input pulses at input terminal 813 is 100 per second, and since counter 800 produces an output pulse at the ITERATION CLOCK PULSE terminal 700 once every 100 pulses it can be readily seen that the frequency of the pulses occuring at the ITERATION CLOCK PULSE terminal 700 is one every second.

The output lines 825–831 of counter 800 are connected to the input of the last, or 128th, data gates of the multiplexer. The clock contents are input to the computer input circuit each time the multiplexer arrives at position 128. The reason for transferring the contents of the iteration clock counter 800 to the computer input is to inform the computer of the time remaining before the next occurrence of the iteration clock pulse. This information permits the computer to keep a record of the program time and to schedule other computer operations and computations during the remaining time before the next iteration clock pulse.

The iteration clock pulse position does not generate an information ready signal in the same manner as the other multiplexer positions. When the multiplexer arrives at the iteration clock position of logical "1" signal will appear at the output of AND gate 440 (see FIGURE 4) and this signal will be coupled through inverting amplifier 490 and will be coupled to the ITERATION CLOCK DATA TRANSFER terminal 495. The signal from the ITERATION CLOCK DATA TRANSFER terminal 495 is fed to the input of inverting amplifier 788. The output of inverting amplifier 788 is fed to the A input of AND gate 786. If the B input of AND gate 786 is a logical "1" at this time, the output of AND gate 786 will be coupled through inverting amplifier 787 and OR gate 753 to the "0" input 671 of flip-flop 667 thereby setting flip-flop 667 to the "0" state. In this manner an INFORMATION READY signal for the iteration clock position is generated and the clock contents are transferred to the computer input.

The B input of AND gate 786 is controlled by the "1" output of one-shot multivibrator 782. The input 783 of one-shot multivibrator 782 is connected to terminal 781 which is adapted to receive a trigger signal shortly before the iteration clock counter 800 is incremented and the iteration clock pulse appears at ITERATION CLOCK PULSE TERMINAL 700. The trigger signal at terminal 781 triggers one-shot multivibrator 782 which produces a logical "0" signal at its output 784 for a predetermined period. This signal is applied to B input of AND gate 786. If the multiplexer arrives in the iteration clock position during this time, input A of AND gate 786 will change to a logical "1"; however, the output of AND gate 786 will be held at the logical "0" level by the output of one-shot multivibrator 782. At the end of the one-shot multivibrator pulse period, input B of AND gate 786 returns to the logical "1" level. The output of the AND gate 786 returns to the logical "1" level and resets flip-flop 667 as previously described.

It is to be understood that while I have shown and described a specific embodiment of my invention that this is for the purpose of illustration only and that my invention is to be limited solely by the scope of the appended claims.

I claim as my invention:

1. Apparatus of the class described comprising:
   a binary counter having a plurality of outputs representative of bits of a binary number;
   decoder means connected to said binary counter for decoding the lower order bits of said binary counter into an equivalent number in a series of numbers having a radix other than two, and for decoding the higher order output bits of said binary counter into an equivalent number in a second series of numbers having a radix other than two;

means for combining the numbers of said first series with the numbers of said second series to form a plurality of signal pairs, one signal in each pair coming from the first and second series, the number of said plurality of said signal pairs being equal to the maximum count of said binary counter;

a plurality of data gating circuits each having inputs adapted to receive inputs from separate input sources, and each having outputs adapted to be connected to a load;

means connecting said plurality of signal pairs to said plurality of data gating circuits whereby each signal pair of said plurality controls the conduction of one of said plurality of data gating circuits;:

an iteration clock counter having an input and output, the input of said clock counter being adapted to receive clock timing pulses and the output being indicative of the count in said clock counter;

and means connecting the output of said iteration clock counter to the input of one of said plurality of data gating circuits.

2. Apparatus of the class described comprising:

a binary counter having a plurality of outputs representative of bits of the binary number, said counter having first inputs adapted to be connected to an input signal source whereby the count of the counter can be automatically set to any desired count, and a second input which, when energized, causes the count of the counter to be sequentially increased one count at a time;

decoder means connected to the output of said binary counter for decoding the lower order output bits of said binary counter to an equivalent number in a series of numbers having a radix other than two, and for decoding the higher order output bits of said binary counter into an equivalent number in a second series of numbers having a radix other than two;

means for combining the numbers of said first series with the numbers of said second series to form a plurality of signal pairs, one signal in each pair coming from the first and second series, the number of said plurality of signal pairs being equal to the maximum count of said binary counter;

a plurality of data gating circuits each having inputs and outputs;

means adapted to connect the inputs of each of said plurality of data gating circuits to a separate data source;

means adapted to connect the outputs of each of said plurality of said data gating circuits to a load;

a plurality of control gates each having first and second inputs and first and second outputs;

means connecting the first input of each of said control gates to one of said plurality of said signal pairs;

means connecting the first outputs of said control gates to said data gating circuits whereby each of said control gates controls the conduction of one of said plurality of data gating circuits;

means adapted to connect each of said second inputs of said plurality of control gates to a separate one of said data sources whereby said control gate produces an output at its first output when there is an output from their respective data sources, and produces an output at its second output when there is no output from their respective data sources;

control means having first, second, third and fourth inputs and first and second outputs;

means connecting the first output of said control means to the second input of said binary counter;

a NO INFORMATION gate having a plurality of inputs and an output, one of said plurality of inputs being connected to the second output of each of said control gates;

means connecting the output of said NO INFORMATION gate to the first input of said control means whereby a signal from said NO INFORMATION gate causes said control means to produce a signal on its first output thereby causing said binary counter to increase by one count;

an INFORMATION READY gate having a plurality of inputs an an output, one of said plurality of inputs being connected to each of the first outputs of said control gates;

means connecting the output of said INFORMATION READY gate to the second input of said control means thereby causing said control means to produce an output signal at its second output;

means adapted to connect the second output of said control means to said load whereby the output signal on the second output of said control means provides a data transfer indication;

means adapted to connect the third input of said control means to said load whereby a signal on said third input will cause said control means to produce an output signal on its first output thereby causing the count in the binary counter to increase by one;

an iteration clock counter having an input adapted to receive clock timing pulses, said clock counter being operable to produce a first output signal indicative of the present count in the counter and a second output signal each time the counter counts through its maximum count;

means connecting the first output signal of said iteration clock counter to the input of one of said plurality of data gating circuits;

and means connecting the second output signal of said iteration clock counter to the fourth input of said control means whereby said control means produces an output signal on its first output thereby causing the count in the binary counter to increase by one.

3. Apparatus of the class described comprising:

a binary counter having a plurality of outputs representative of bits of the binary number, said counter having first inputs adapted to be connected to an input signal source whereby the count of the counter can be automatically set to any desired count, and a second input which, when energized, causes the count of the counter to be sequentially increased one count at a time;

decoder means connected to the output of said binary counter for decoding the lower order output bits of said binary cunter to an equivalent number in a first series of numbers having a radix other than two, and for decoding the higher order output bits of said binary counter into an equivalent number in a second series of numbers having a radix other than two;

means for combining the numbers of said first series with the numbers of said second series to form a plurality of signal pairs, one signal in each pair coming frmo the first and second series, the number of said plurality of signal pairs being equal to the maximum count of said binary counter;

a plurality of data gating circuits each having inputs and outputs;

means adapted to connect the inputs of each of said plurality of data gating circuits to a separate data source;

means adapted to connect the outputs of each of said plurality of data gating circuits to a load;

a plurality of control gates each having first and second inputs and first and second outputs;

means connecting the first input to each of said control gates to one of said plurality of signal pairs;

means connecting the first outputs of said control gates to said data gating circuits whereby each of said control gates controls the conduction of one of said plurality of data gating circuits;

means adapted to connect each of said second inputs of said plurality of control gates to a separate one of said data sources whereby each of said control gates produces an output signal at its first output when there is an output from its respective data source, and produces an output signal at its second output when there is no output from its respective data source;

control means having first, second and third inputs and first and second outputs;

means connecting the first output of said control means to the second input of said binary counter;

a NO INFORMATION gate having a plurality of inputs and an output, one of said plurality of inputs being connected to the second output of each of said control gates;

means connecting the output of said NO INFORMATION gate to the first input of said control means whereby a signal from said NO INFORMATION gate causes said control means to produce a signal on its first output thereby causing said binary counter to increase by one count;

an INFORMATION READY gate having a plurality of inputs and an output, one of said plurality of inputs being connected to each of the first outputs of said control gates;

means connecting the output of said INFORMATION READY gate to the second input of said control means thereby causing said control means to produce an output signal at its second output;

means adapted to connect the second output of said control means to said load whereby the output signal on the second output of said control means provided a data transfer indication;

and means adapted to connect the third input of said control means to said load whereby a signal on said third input will cause said control means to produce an output signal on its first output thereby causing the count in the binary counter to increase by one.

4. Apparatus of the class described comprising:

a binary counter having a plurality of outputs representative of bits of a binary number, said counter having inputs adapted to be connected to an input signal source whereby the count in said counter can either be sequentially increased one count at a time or can be automatically set to any desired count;

decoder means connected to said binary counter for decoding the lower order output bits of said binary counter into an equivalent number in a first series of numbers having a radix other than two, and for decoding the higher order output bits of said binary counter into an equivalent number in a second series of numbers having a radix other than two;

means for combining the numbers of said first series with the numbers of said second series to form a plurality of signal pairs, one signal in each pair coming from the first and second series, the number of said plurality of said signal pairs being equal to the maximum count of said binary counter;

a plurality of data gating circuits each having inputs and outputs;

means adapted to connect the inputs of each of said plurality of data gating circuits to a separate input source;

means adapted to connect the output of each of said plurality of data gating circuits to a load;

and means connecting said plurality of signal pairs to said plurality of data gating circuits whereby each signal pair of said plurality controls the conduction of one of said plurality of data gating circuits.

5. Apparatus for the class described comprising:

decoding means for converting the lower order bits of a binary number input into an equivalent number in a first series of numbers having radix other than two, and for converting the higher order bits of the binary number input into an equivalent number in a second series of numbers having a radix other than two;

means for combining the numbers of said first series with the numbers of said second series to form a plurality of signal pairs, one signal in each pair coming from the first and second series, the number of said plurality of signal pairs being equal to the maximum binary number input;

and means adapted to connect each of the signal pairs of said plurality in controlling relationship to a separate data gate.

6. Apparatus of the class described comprising:

a binary counter having a plurality of outputs representative of bits of a binary number;

decoder means connected to said binary counter for decoding the lower order output bits of said binary counter into an equivalent number in a first series of numbers having a radix other than two, and for decoding the higher order output bits of said binary counter into an equivalent number in a second series of numbers having a radix other than two;

and means for combining the numbers of said first series with the numbers of said second series to form a plurality of signal pairs, one signal in each pair coming from the first and second series, the number of said plurality of said signal pairs being equal to the maximum count of said binary counter.

7. Apparatus of the class described comprising:

a binary counter having a plurality of outputs representative of bits of the binary number, said counter having first inputs adapted to be connected to an input signal source whereby the count of the counter can be automatically set to any desired count, and a second input which, when energized causes the count of the counter to be sequentially increased one count at a time;

decoder means connected to the output of said binary counter for decoding the lower order output bits of said binary counter to an equivalent number in a first series of numbers, and for decoding the higher order output bits of said binary counter into an equivalent number in a second series of numbers;

means for combining the numbers of said first series with the numbers of said second series to form a plurality of signal pairs, one signal in each pair coming from the first and second series, the number of said plurality of said signal pairs being equal to the maximum count of said binary counter;

a plurality of data gating circuits each having inputs and outputs;

means adapted to connect the inputs of each of said plurality of data gating circuits to a separate data source;

means adapted to connect the outputs of each of said plurality of said data gating circuits to a load;

a plurality of control gates each having first and second inputs and first and second outputs;

means connecting the first input of each of said control gates to one of said plurality of said signal pairs;

means connecting the first outputs of said control gates to said data gating circuits whereby each of said control gates controls the conduction of one of said plurality of data gating circuits;

means adapted to connect each of said second inputs of said plurality of control gates to a separate one of said data sources whereby each of said control gates produces an output signal at its first output when there is an output from its respective data source, and produces an output signal at its second output when there is no output from its respective data source;

control means having first and second inputs and first and second outputs;

means connecting the first output of said control means to the second input of said binary counter;

a NO INFORMATION gate having a plurality of inputs an an output, one of said plurality of inputs being connected to the second output of each of said control gate;

means connecting the output of said NO INFORMATION gate to the first input of said control means whereby a signal from said NO INFORMATION gate causes said control means to produce a signal on its first output thereby causing said binary counter to increase by one count;

an INFORMATION READY gate having a plurality of inputs and an output, one of said plurality of inputs being connected to each of the first outputs of said control gates;

means connecting the output of said INFORMATION READY gate to the second input of said control means thereby causing said control means to produce an output signal at its second output;

and means adapted to connect the second output of said control means to said load whereby the output signal on the second output of said control means provides a data transfer indication.

8. Apparatus of the class described comprising:

a binary counter having a plurality of outputs representative of bits of the binary number, said counter having first inputs adapted to be connected to an input signal source whereby the count of the counter can be automatically set to any desired count, and a second input which, when energized, causes the count of the counter to be sequentially increased one count at a time;

decoder means connected to the output of said binary counter for decoding the lower order output bits of said binary counter to an equivalent number in a series of numbers having a radix other than two, and for decoding the higher order output bits of said binary counter into an equivalent number in a second series of numbers having a radix other than two;

means for combining the numbers of said first series with the numbers of said second series to form a plurality of signal pairs, one signal in each pair coming from the first and second series, the number of said plurality of said signal pairs being equal to the maximum count of said binary counter;

a plurality of data gating circuits each having inputs and outputs;

means adapted to connect the inputs of each of said plurality of data gating circuits to a separate data source;

means adapted to connect the outputs of each of said plurality of said data gating circuits to a load;

a plurality of control gates each having first and second inputs and first and second outputs;

means connecting the first input of each of said control gates to one of said plurality of said signal pairs;

means connecting the first outputs of said control gates to said data gating circuits whereby each of said control gates controls the conduction of one of said plurality of data gating circuits;

means adapted to connect each of said second inputs of said plurality of control gates to a separate one of said data sources whereby each of said control gates produces an output signal at its first output when there is an output from its respective data source, and produces an output signal at its second output when there is no output from its respective data source;

control means having an input and an output;

means connecting the output of said control means to the second input of said binary counter;

a NO INFORMATION gate having a plurality of inputs and an output, one of said plurality of inputs being connected to the second output of each of said control gates;

and means connecting the output of said NO INFORMATION gate to the input of said control means whereby a signal from said NO INFORMATION gate causes said control means to produce a signal on its output thereby causing said binary counter to increase by one count.

9. Apparatus of the class described comprising:

a binary counter capable of increasing its count incrementally one count at a time or of being instantaneously set to any desired count;

means for decoding the count in said binary counter into a plurality of signal pairs, one signal in each signal pair being decoded from the lower order bits of said binary counter and the other signal in each signal pair being decoded from the higher order bits of said binary counter;

and a plurality of data gates, each of said data gates being controlled by a separate one of said plurality of signal pairs and operable to transfer an input signal to a load.

10. Apparatus of the class described comprising:

a plurality of data gates each having an input adapted to receive input information, an output adapted to be connected to a load, and a control input;

first means connected to the control inputs of said plurality of data gates to sequentially activate each of the data gates and to stop the sequential activation after the last of all of the data gates has been activated;

an iteration clock circuit having a first output providing clock pulses at a particular frequency and a second output providing a signal indicative of the elapsed time since the last clock pulse;

second means connecting the first output of said iteration clock circuit to said first means whereby each clock pulse initiates a new sequential activation cycle provided the previous sequential activation cycle is completed;

and third means connecting the second output of said iteration clock circuit to the input of the last of said plurality of data gates so that when the last data gate is activated the time elapsed since the last clock pulse will be transferred to the output of the last data gate.

No references cited.

ROBERT C. BAILEY, *Primary Examiner.*

P. J. HENON, *Assistant Examiner.*